United States Patent [19]

Todd, Jr. et al.

[11] Patent Number: 4,913,831

[45] Date of Patent: * Apr. 3, 1990

[54] DEICING COMPOSITIONS COMPRISING CALCIUM MAGNESIUM ACETATE DOUBLE SALT AND PROCESSES FOR THEIR PRODUCTION

[75] Inventors: Harold E. Todd, Jr., Pinole; Daniel L. Walters, San Francisco, both of Calif.

[73] Assignee: Chevron Research Company, San Francisco, Calif.

[*] Notice: The portion of the term of this patent subsequent to Aug. 8, 2005 has been disclaimed.

[21] Appl. No.: 144,848

[22] Filed: Jan. 14, 1988

Related U.S. Application Data

[63] Continuation-in-part of Ser. No. 77,148, Jul. 24, 1987, abandoned, which is a continuation-in-part of Ser. No. 3,097, Jan. 14, 1987, abandoned.

[51] Int. Cl.[4] .......................... C09K 3/18; C07B 51/42
[52] U.S. Cl. ..................................... 252/70; 427/220; 428/403; 562/607; 562/608
[58] Field of Search ........................ 252/70; 427/220; 428/403; 562/607, 608

[56] References Cited

U.S. PATENT DOCUMENTS

| | | | |
|---|---|---|---|
| 2,308,289 | 1/1943 | Lawrence | 252/70 |
| 4,243,415 | 1/1981 | Lowe, Jr. | 106/13 |
| 4,247,331 | 1/1981 | Hamlin et al. | 252/70 |
| 4,444,672 | 4/1984 | Gancy | 252/70 |
| 4,588,512 | 5/1986 | Rippie | 252/70 |
| 4,606,836 | 8/1986 | Gancy | 252/70 |

OTHER PUBLICATIONS

Hawley, *The Condensed Chemical Dictionary*, Eighth Ed., 1971, p. 790.

*Primary Examiner*—Robert Wax
*Attorney, Agent, or Firm*—R. C. Gaffney; S. L. Biggs

[57] ABSTRACT

Compositions which comprise a calcium magnesium acetate double salt are useful in deicing compositions. Deicing compositions comprising those compositions and processes for their preparation are described.

39 Claims, 13 Drawing Sheets

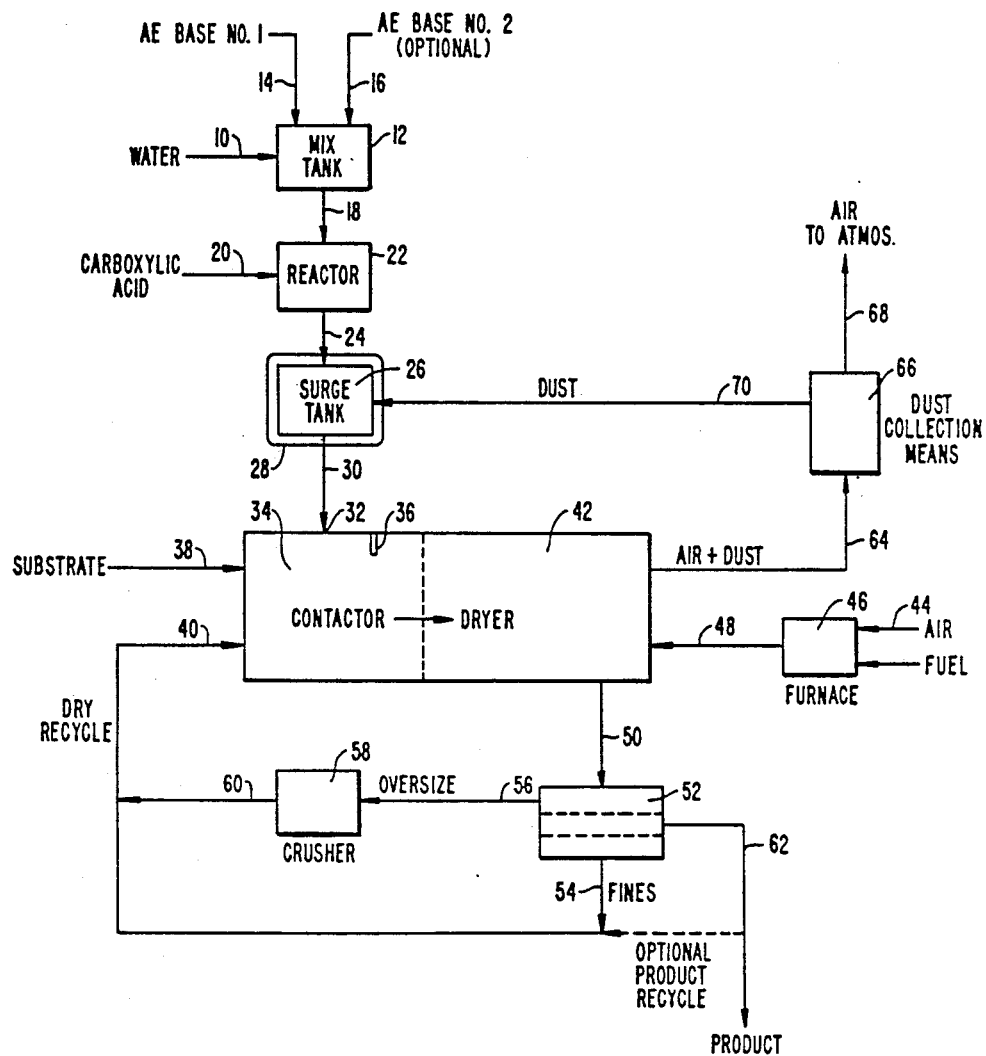
FIG._1.

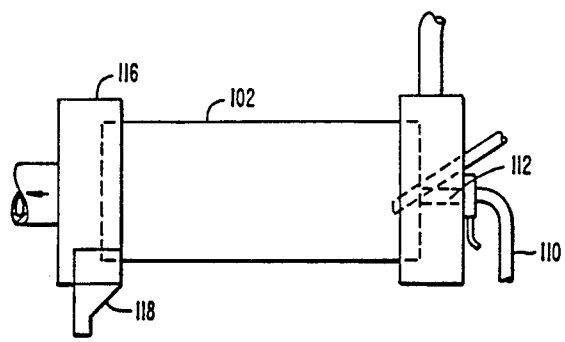
FIG._2.
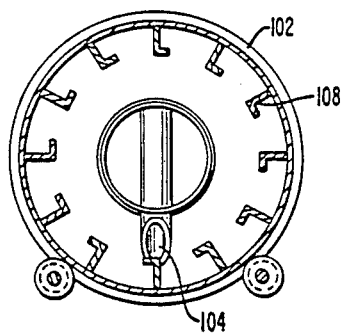
FIG._4.
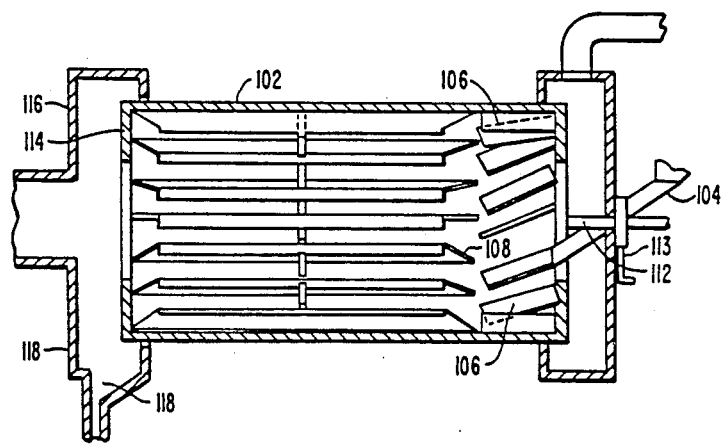
FIG._3.

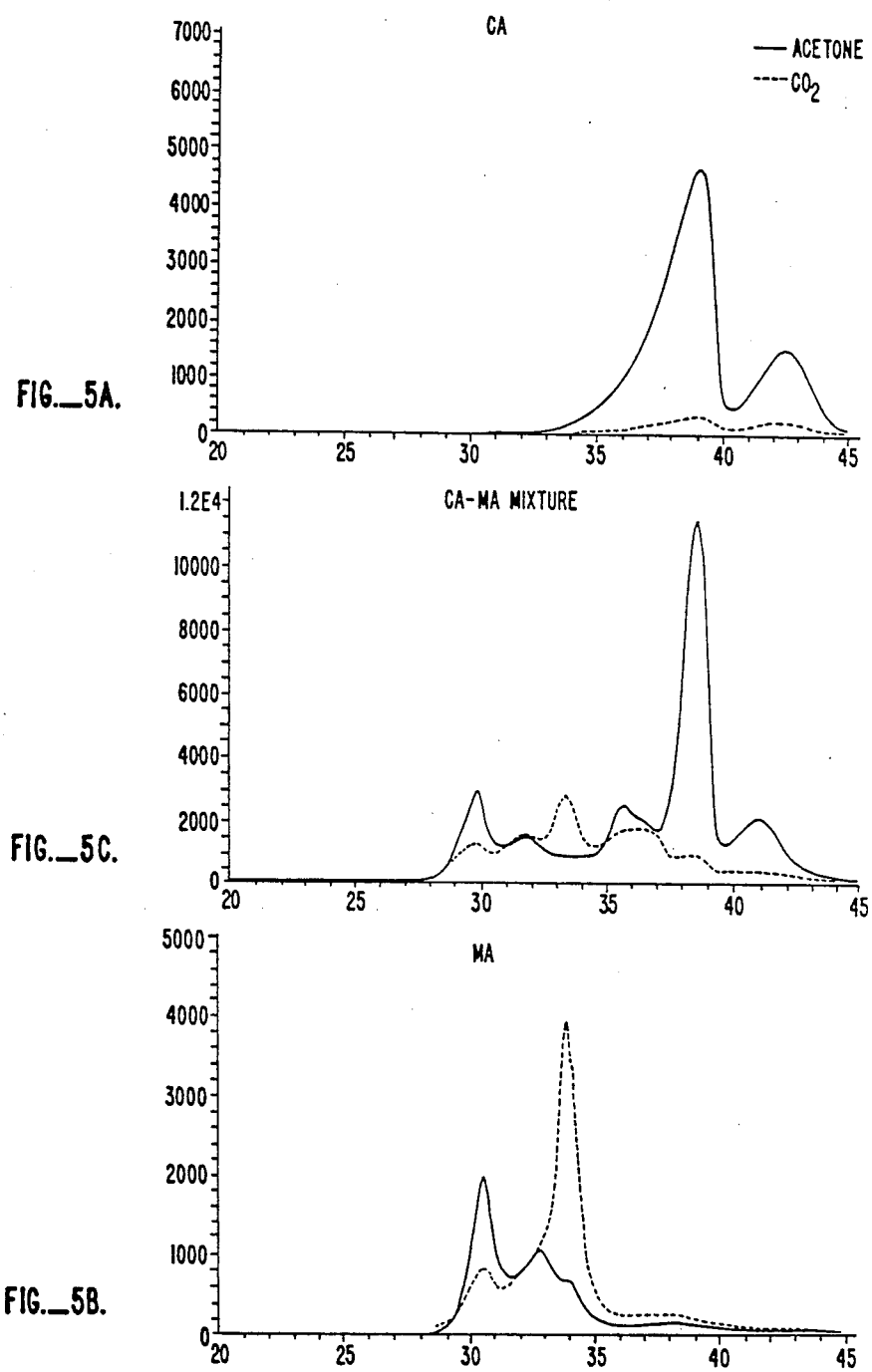
FIG.\_5A.
FIG.\_5C.
FIG.\_5B.

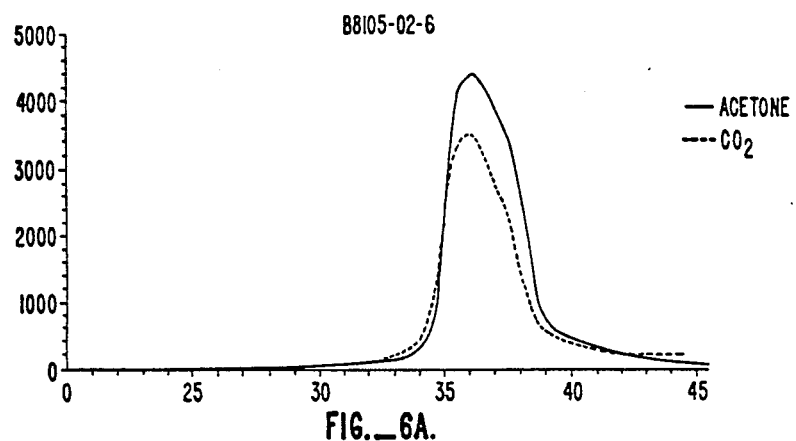
FIG._6A.
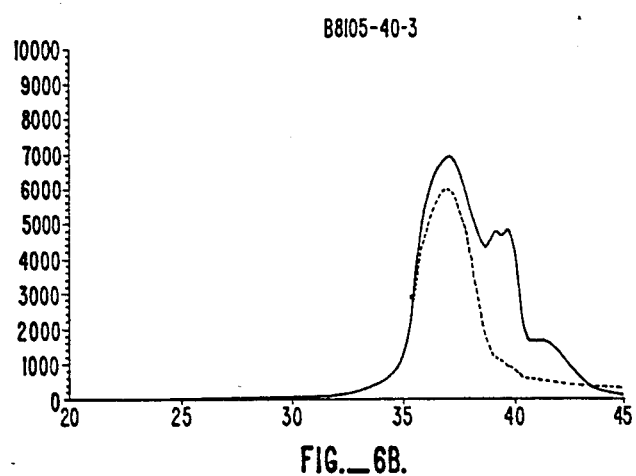
FIG._6B.
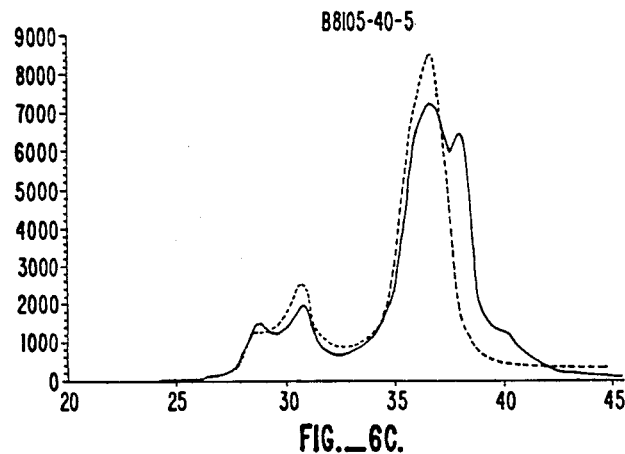
FIG._6C.

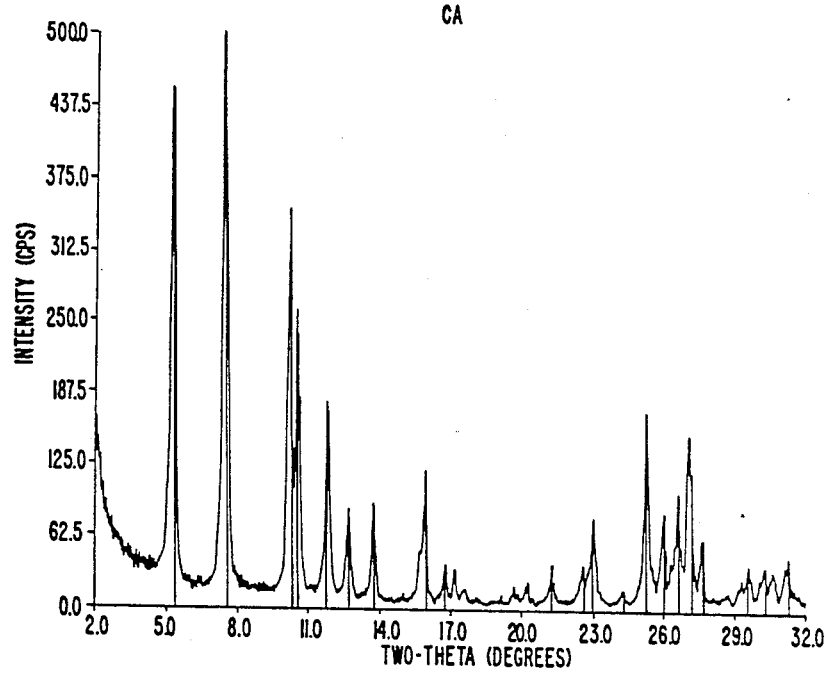
FIG._7A.
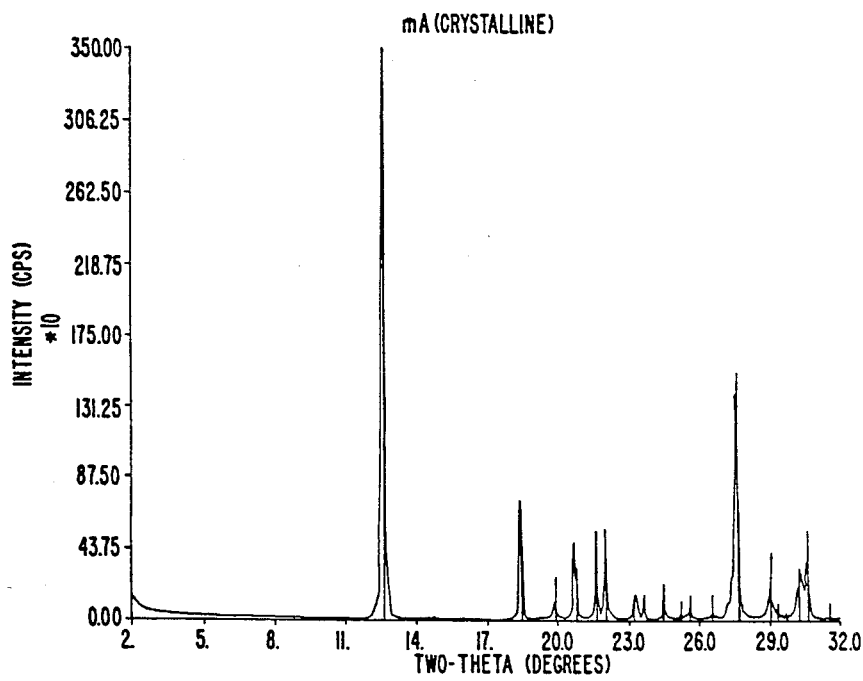
FIG._7B.

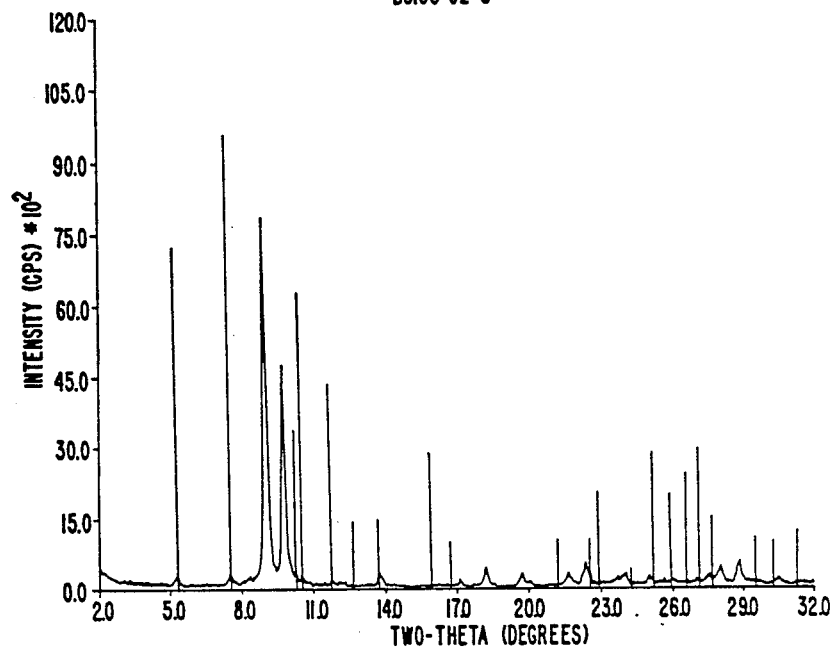
FIG._7C.
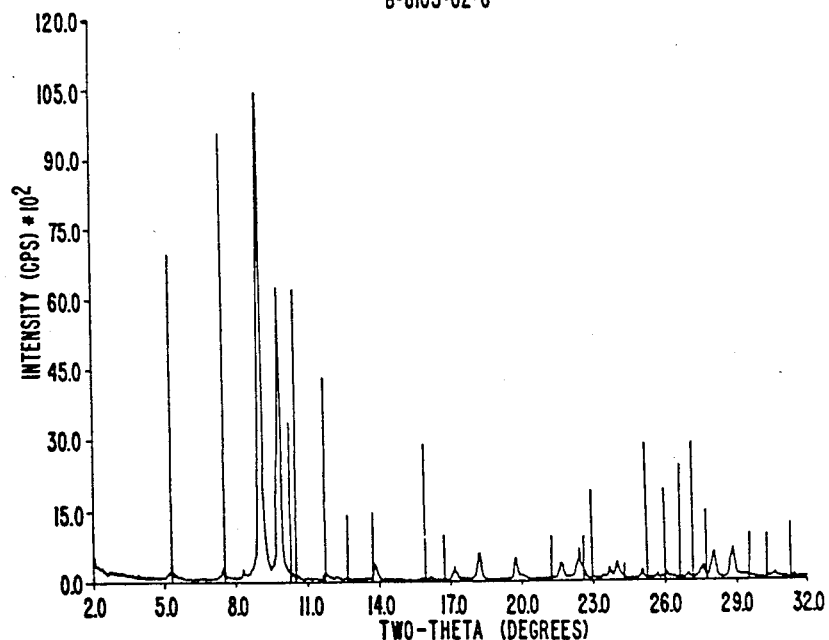
FIG._7D.

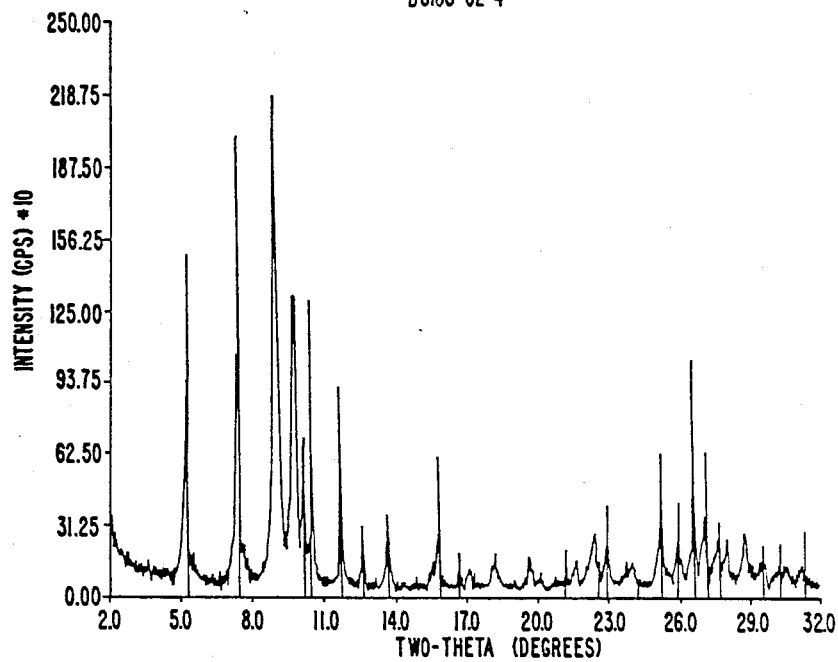
FIG._7E.
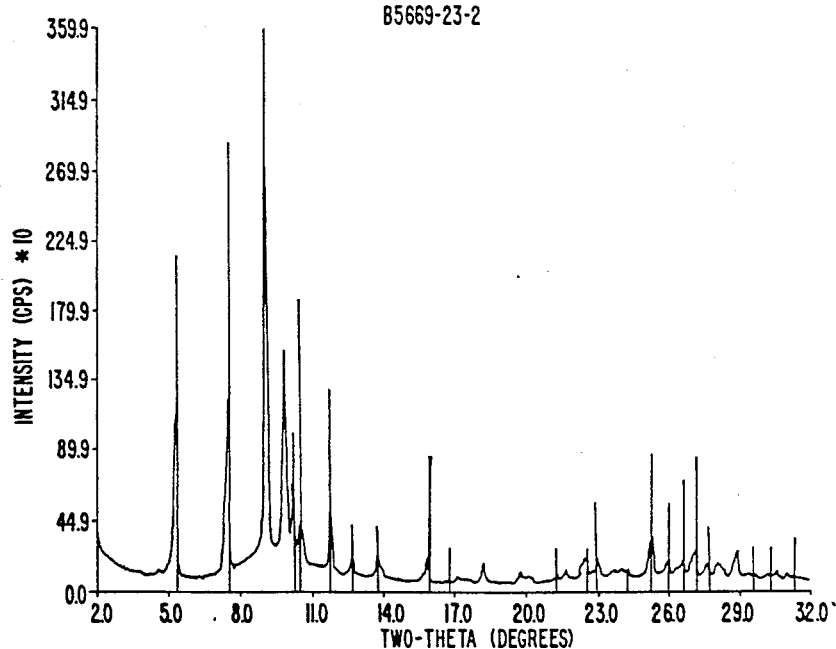
FIG._7F.

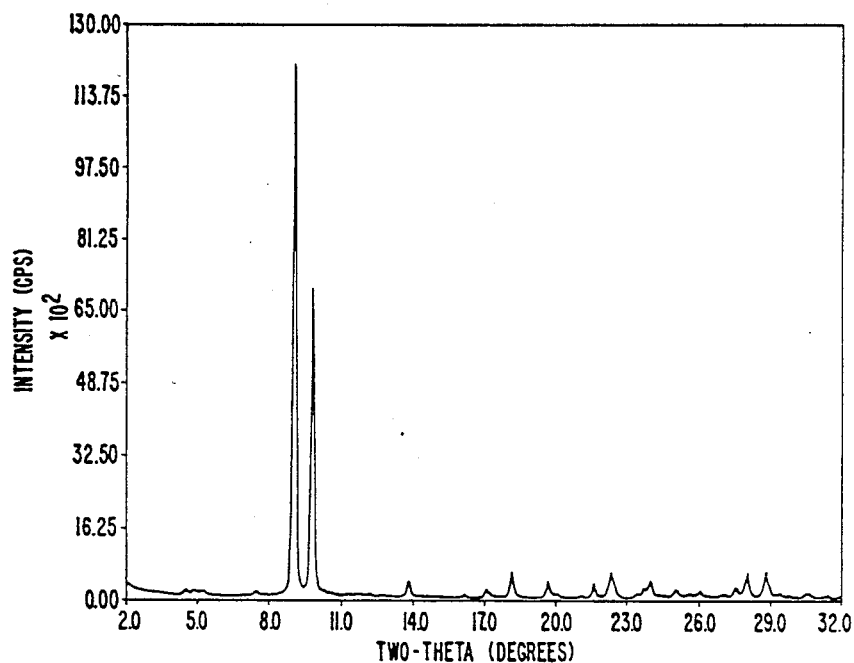
FIG._7G.

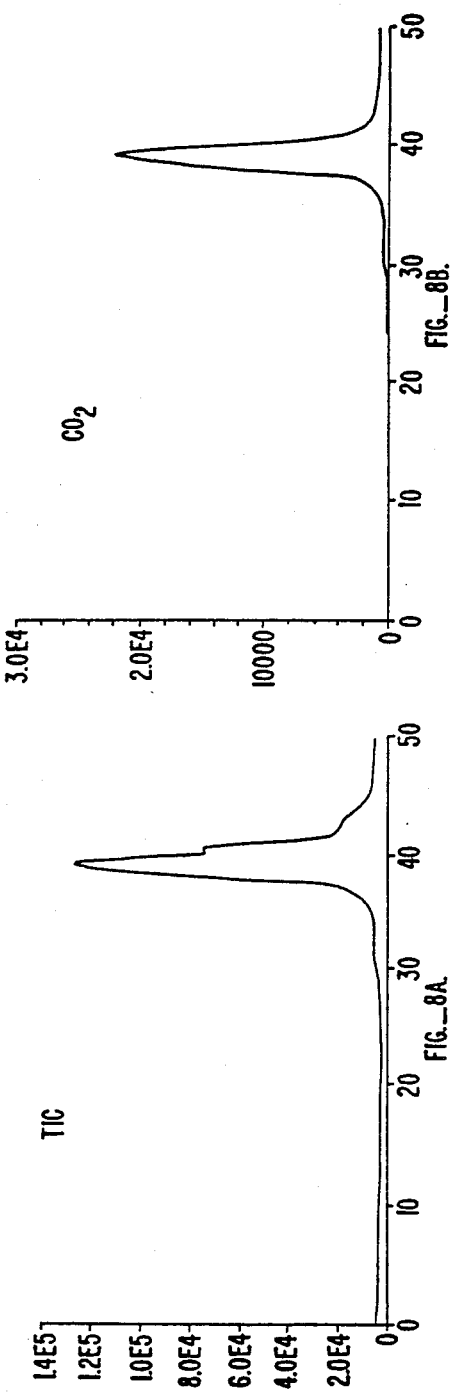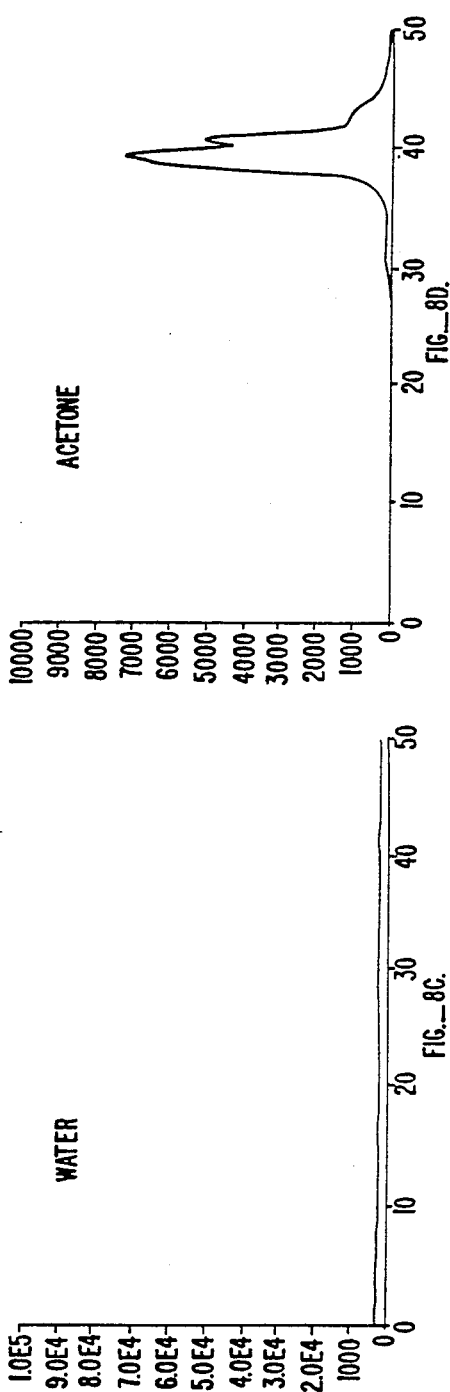

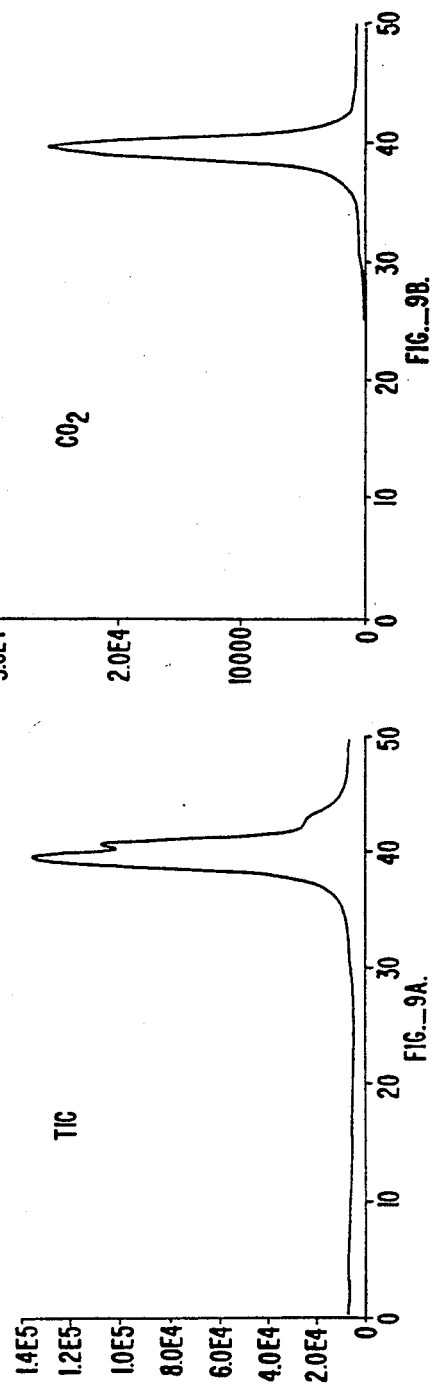
FIG._9A. TIC
FIG._9B. CO₂
CMA DOUBLE SALT - EXAMPLE 10A
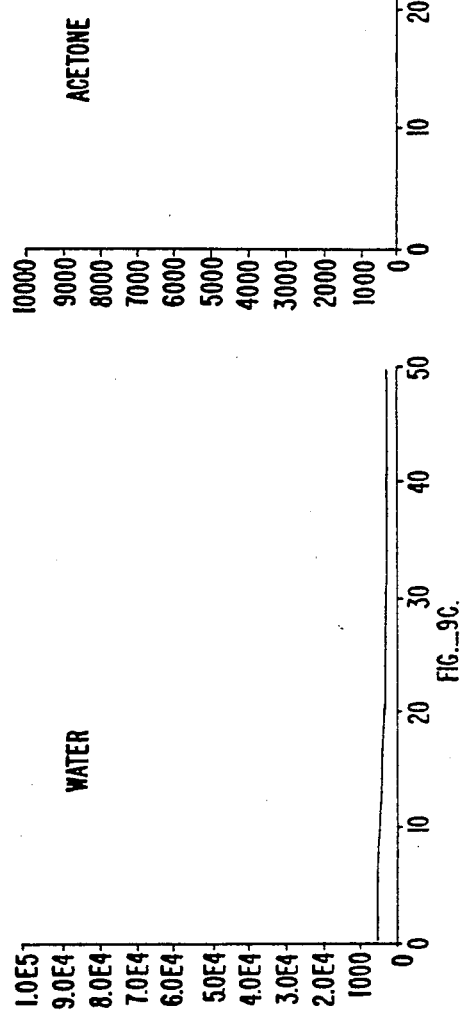
FIG._9C. WATER
FIG._9D. ACETONE

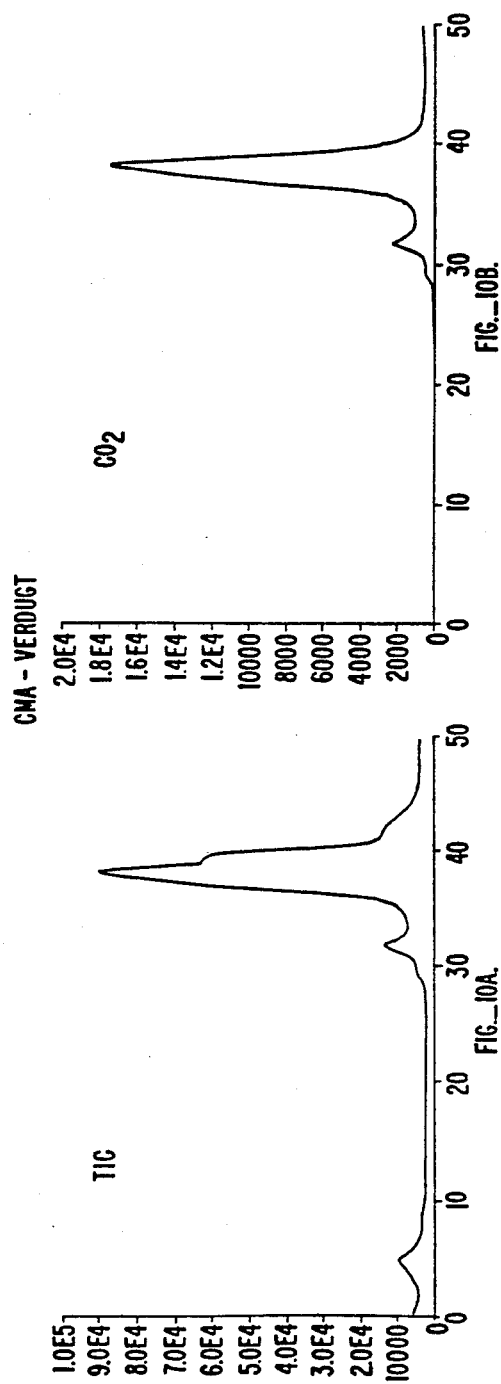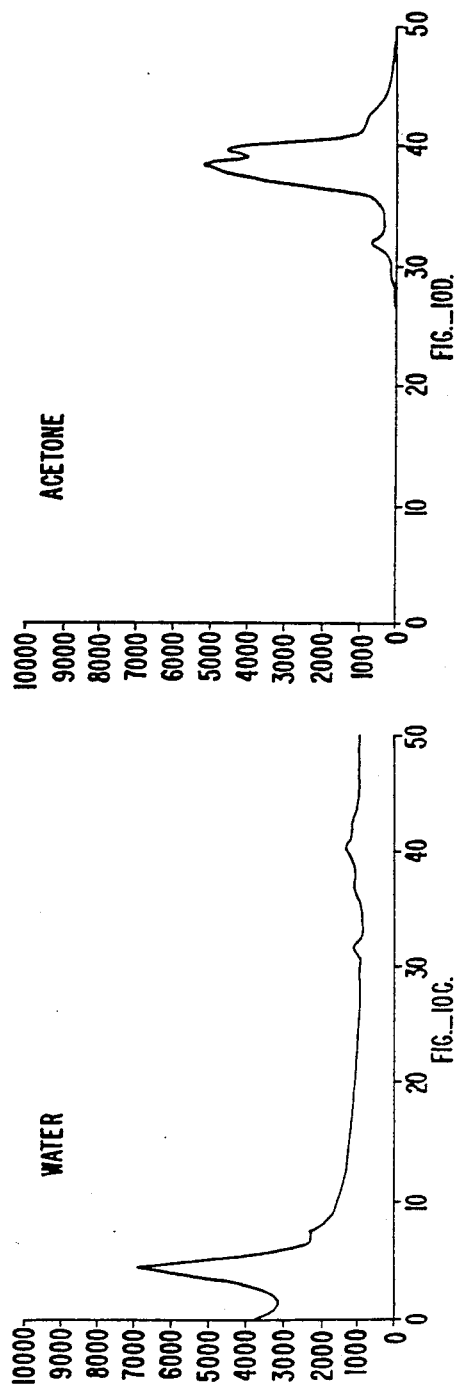

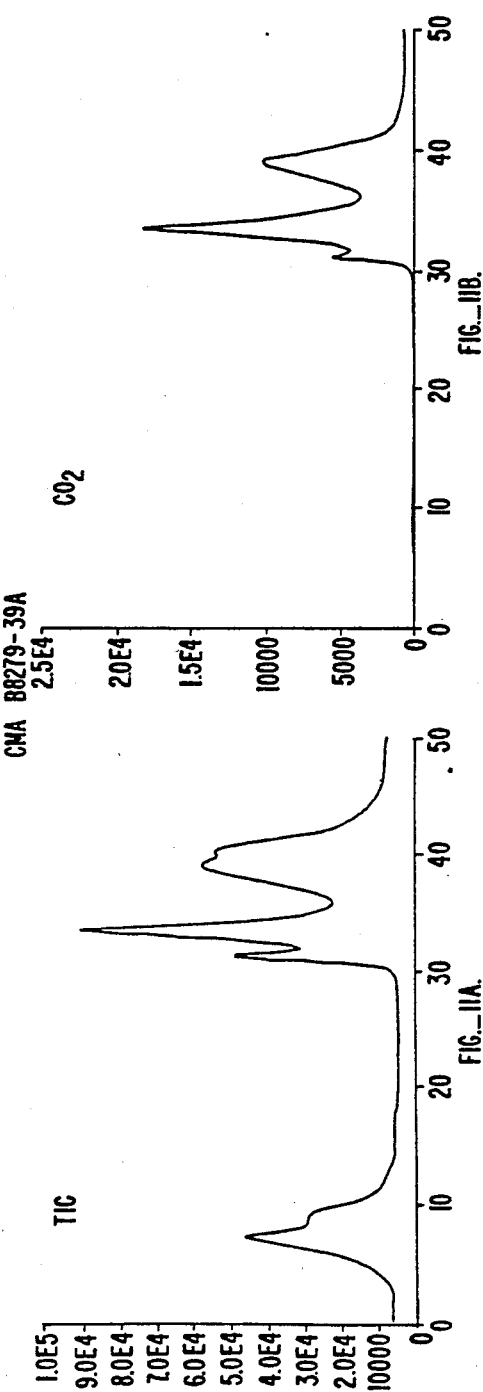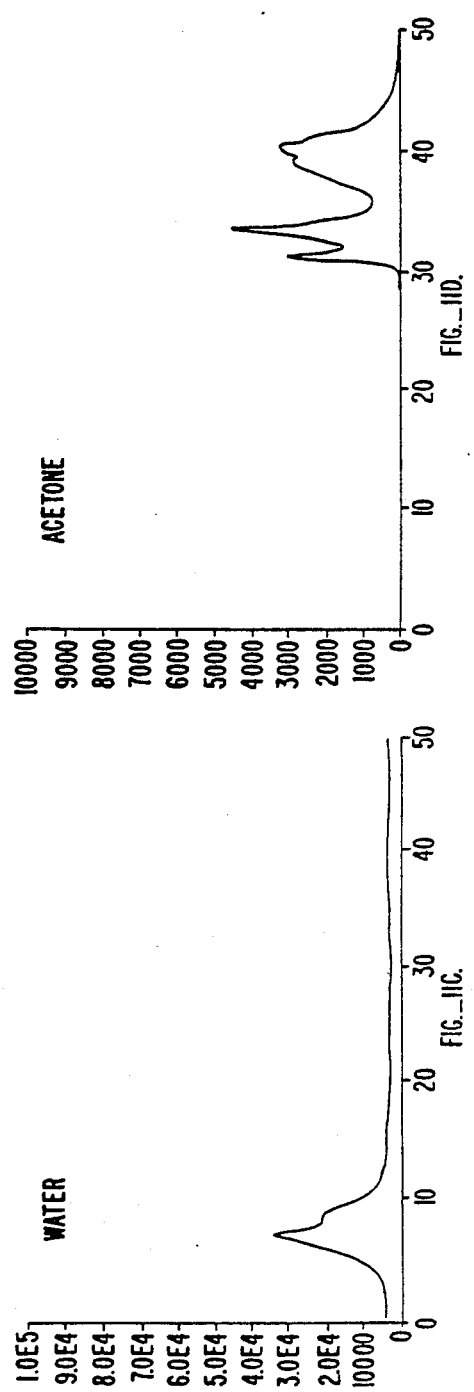
FIG._11A.  FIG._11B.  FIG._11C.  FIG._11D.

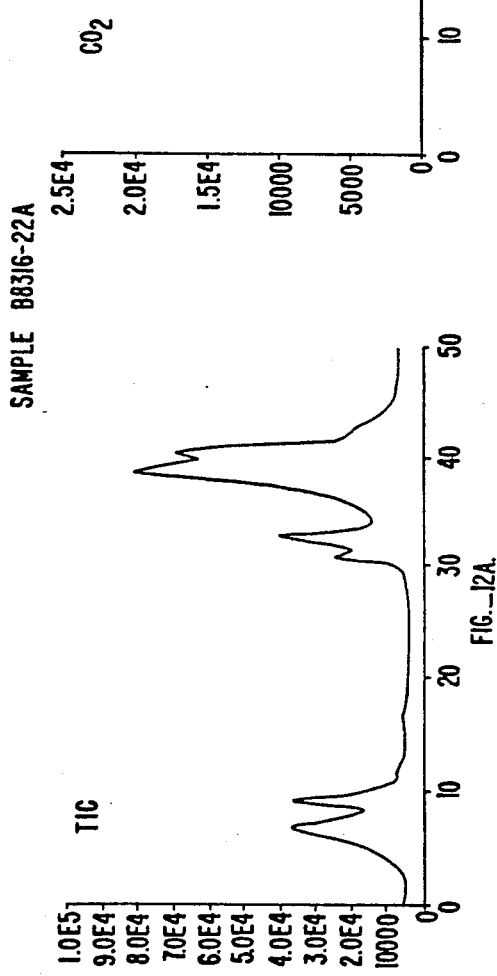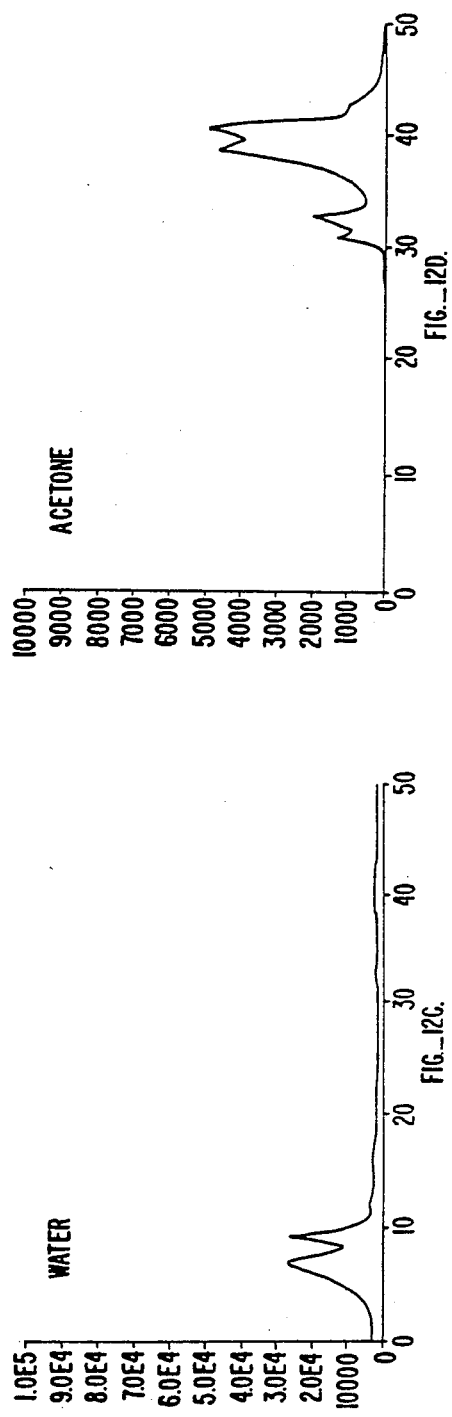
FIG.—12A.  FIG.—12B.  FIG.—12C.  FIG.—12D.

DEICING COMPOSITIONS COMPRISING CALCIUM MAGNESIUM ACETATE DOUBLE SALT AND PROCESSES FOR THEIR PRODUCTION

CROSS-REFERENCE TO RELATED APPLICATION

This application is a continuation-in-part of U.S. Ser. No. 77,148 filed July 24, 1987, now abandoned, which is a continuation-in-part of U.S. Ser. No. 003,097 filed Jan. 14, 1987, now abandoned, the disclosures of both which are incorporated herein by reference.

BACKGROUND OF THE INVENTION

Removal and/or melting of snow and ice on roadways, bridges, sidewalks and the like is a major task in many areas.

Various chemicals have been used to assist in the removal and/or melting of snow and ice. Conventional road salt, has been used extensively in part due to its melting ability and also its relatively low cost. However, it has been found that the low cost of salt has been offset in part by the damage to roadways, bridges, underground cables (such as telephone or electrical cables) and the like, not to mention automobiles, caused by its use. Salt's corrosivity has led to damage to pavement and to the steel structure of bridges and surrounding structures. Moreover, the accumulation in run-off water has caused problems with vegetation. Accumulation in ground water has caused health problems with drinking water due to increased sodium contents. Other salts, such as calcium chloride, have been used; however, calcium chloride too has similar problems and causes accumulation of chloride ion in the environment, which is undesirable.

Accordingly, there has been extensive study on alternative deicing chemicals which are noncorrosive, environmentally acceptable and which are economically practical.

The Federal Highway Administration sponsored an extensive study by the Bjorksten Research Laboratory (BRL) on deicing chemicals. The study's report "Alternative Highway Deicing Chemicals" published March, 1980, identified calcium magnesium acetate (CMA) as a leading candidate for replacing road salt. Since the publication of the BRL report, various groups and individuals have been working on the preparation and testing of deicing agents comprising calcium magnesium acetate, calcium acetate and/or magnesium acetate. (See, e.g., U.S. Pat. Nos. 4,426,308, 4,444,672, 4,511,485, and 4,606,836.) However, preparing CMA economically on a commercial scale has been a problem. See, e.g., Ganoy, Alan B., "Preparation of High Quality Calcium Magnesium Acetate Using a Pilot Plant Process", Federal Highway Administration (January, 1986). Dried large lumps of CMA in the product has been a problem, as has unacceptable levels of fugitive dust from product. See, e.g., "Continuous Production Calcium Magnesium Acetate/Sand Deicer" prepared by Cedarapids Inc. for Iowa Highway Research Board, June 3, 1985.

Previous processes have exhibited problems with dusting of powdered lime and unacceptable levels of acid odor and vapor in recycled material, bed material, and even product.

Previous calcium magnesium acetate-coated sand deicing agents have used a wetting agent, such as a cement-grinding aid, as a binder. See U.S. Pat. No. 4,588,512 to Rippie.

U.S. Pat. No. 4,699,725 to Gancy discloses magnesium calcium acetate compositions and processes for their manufacture.

Our copending U.S. patent application Ser. No. 003,097, filed Jan. 14, 1987, discloses deicing compositions comprising alkaline earth or alkali metal carboxylates and processes for their production. The disclosure of U.S. Ser. No. 003,097 is incorporated herein by reference.

Our copending, commonly assigned, U.S. Pat. application Ser. No. 77,148, filed July 24, 1987, discloses deicing compositions comprising calcium magnesium acetate double salt. The disclosure of U.S. Ser. No. 77,148 is incorporated herein by reference.

SUMMARY OF THE INVENTION

The present invention is directed to compositions comprising a calcium magnesium acetate double salt which are useful as deicing compositions and to processes for preparing said deicing compositions.

The deicing compositions of the present invention comprise substantially pure CMA double salt which is substantially free from crystalline calcium acetate, magnesium acetate and unreacted magnesium base.

In one embodiment, these compositions comprise CMA double salt which is substantially anhydrous. By "substantially anhydrous" is meant comprising less than about 5 percent water [or less than about 0.45 mole water per each mole of calcium or magnesium; e.g., if a CMA double salt had the approximate empirical formula of $CaMg_2(C_2H_3O_2)_6$, then the double salt would have less than 1.35 mole water per mole CMA double salt]. Preferred are compositions comprising less than about 2.5 percent by weight water (compositions with the above-noted empirical formula would have 0.65 mole water per mole or about 0.21 mole water per mole calcium or magnesium). Our findings are in contrast to teachings that desirably CMA compositions have 3 to 4 moles water per mole magnesium (thus, a CMA composition having a calcium:magnesium ratio of 1:2 would have about 6 to 8 moles water or about 20 to 25 percent by weight water). See U.S. Pat. No. 4,694,725 to Gancy.

It is believed that the CMA double salts of the present invention have the approximate empirical formula: $Ca_xMg_y(C_2H_3O_2)_{2(x+y)}$ where $x=3$ to 4 and $y=7$ to 6. Accordingly, the calcium:magnesium ratios may range from about 4:6 to about 3:7, preferably from about 3:6 to about 3:7.

The compositions of the present invention comprise substantially pure CMA double salt which is substantially free of crystalline CA and crystalline MA as evidenced by X-ray diffraction. These compositions are also substantially free of amorphous (as well as crystalline) MA and free of unreacted magnesium base as determined by thermogravametric analysis-gas chromatography-mass selective detector ("TGA-GC-MSD"). (That technique takes evolved gases through thermogravametric analysis and subjects them to gas chromatography using a mass selective detector set at 20–200 atomic mass units. See Examples 14 and 15 for further description).

A comparison of the X-ray diffraction patterns of the compositions of the present invention (see FIGS. 7C, 7D and 7G) to CA, MA, and other CMA compositions (see FIGS. 7A, 7B, 7G, and 7F) and the TGA-GC- MSD spectra of the present invention (see FIGS. 6A, FIGS. 8A to 8D, and FIGS. 9A to 9D) with those from CA, MA, a physical mixture of CA and MA and other CMA compositions (see FIGS. 5A to 5C, 6B, 6C, FIGS. 10A to 10D, FIGS. 11A to 11D, and FIGS. 12A to 12D) show that the CMA double salts of the present invention are distinctly different from those other compositions.

The CMA double salt described herein has different properties than either calcium acetate or magnesium acetate or a physical mixture of the two. For instance this CMA double salt differs in solubility in water from either calcium acetate and/or magnesium acetate. Laboratory studies indicate that this CMA double salt is much less soluble in water than either CA or MA. Furthermore, this CMA double salt appears to have a characteristic crystalline structure as evidenced by analytical techniques such as X-ray crystallography (see procedure described in Example 16 and FIGS. 7C, 7D, and 7F) and TGA-GC-MSD analysis (see procedure described in Example 15 and FIG. 6A and FIGS. 8A to 8D and FIGS. 9A to 9D).

Moreover, these deicing compositions show improved ice melting behavior over what would be expected by a mixture of calcium acetate and magnesium acetate on a molar basis. This is surprising in view of the afore-noted poor solubility in water of CMA double salt.

According to a preferred embodiment of the present invention CMA double salt compositions are provided which comprise substantially isodimensional pellets which have bulk densities of at least 40 pounds per cubic foot particle specific gravities greater than 1.2, and attrition of less than about 3 percent (as measured by ASTM D 4058-81). Other superior handling characteristics of these compositions include having a fairly even size distribution, and being low in dust and low in acetic acid odor. Thus, the deicing compositions of the present invention may be distributed using conventional machinery for distributing deicing chemicals such as road salt. Moreover, due to this relatively high bulk density, these deicing compositions are not prone to blowing away once applied to snow or ice, unlike previously used compositions comprising CMA. (See "High Sierra Is Site For Caltrans CMA Tests," *Roads & Bridges*, June 1987, pp. 48–49.)

In one embodiment these deicing compositions comprise a plurality of layers of a CMA composition of the present invention on discrete substrate particles. Such substrate particles may optionally comprise a traction aid and/or CMA particles.

The present invention also provides processes for preparing a calcium magnesium acetate double salt which is substantially free from crystalline calcium acetate, magnesium acetate and unreacted magnesium base which comprise (a) preparing an aqueous mixture of calcium and magnesium base ("CM base") having a calcium:magnesium ratio of from about 4:6 to about 3:7, preferably from about 3:6 to about 3:7 which comprises about 40 percent by weight water: (b) admixing the mixture of step (a) with from about 70 percent to about 110 percent of a stoichiometric amount of acetic acid, the resulting mixture having at least about 50 percent by weight water to give a CMA slurry; (c) if required, adding additional acetic acid to give an approximately stoichiometric amount in relation to CM base; and aging the slurry of step (c) to allow substantially complete reaction of the calcium and magnesium bases with acetic acid. Optionally, said process may include (e) drying pelletizing slurry of step (d). By "stoichiometric amount" is meant the number of moles of acetic acid (or acetate) needed to react completely with calcium or magnesium ion, or two moles acetic acid (acetate) for each mole of calcium and magnesium ion.

In a preferred embodiment of the process of the present invention, in step (b) about 70 percent to about 95 percent, more preferably about 90 percent, of the stoichiometric amount of acetic acid is added at once, after mixing the pH is measured (diluting the CMA slurry 1 part slurry to 2 parts water before measuring the pH) and if above about 8 to 8.5, the pH is adjusted to about 7 to about 8.5, preferably about 7.5 to about 8 by the addition of additional acetic acid. Optionally, if too low a pH is obtained (about 6½ or less) after the aging step it may be increased to the more preferred range by adding re-slurried CMA dust (from dust collection means, see page 19) in water.

In a preferred embodiment of the process of the present invention, a continuous process is employed. In such a continuous process, the slurry is aged by allowing it to flow through a reactor train that has sufficient residence time to allow for complete reaction of the CM base with acetic acid. Suitable residence times are in the range of about 3½ or 4 hours. Longer residence times may be used if desired.

We have disclosed that hot slurries have advantageous handling properties. Since the reaction between the CM base and acetic acid is exothermic, slurry temperatures in the range of about 130° F. to 150° F. or greater may be obtained due to the heat of reaction alone. However, if the temperature of the slurry begins to fall below that range, it is advantageous to heat the slurry to at least 130° F. to 150° F., preferably to about 170° F. to about 200° F. Temperatures above 200° F. may be used if desired.

In the processes of the present invention we have found that by mixing at once the CM base and acetic acid in essentially stoichiometric amounts in a reasonably dilute aqueous medium and then aging the resulting slurry, substantially complete reaction is obtained and a CMA double salt composition is obtained that is substantially free from unreacted magnesium base and is substantially anhydrous and also, according to data obtained by X-ray diffraction and TGA-GC-MSD, is substantially free from either calcium acetate and magnesium acetate per se. This result is surprising in that processes disclosed by others produce products having substantial amounts of unreacted magnesium base and/or substantial amounts of calcium acetate and/or magnesium acetate as determined by the above-noted analytical methods. (See FIGS. 6B, 6C, 10A to 10D, 11A to 11D, and 12A to 12D.)

As noted above, the CMA double salt prepared according to the processes of a preferred embodiment of the present invention is substantially anhydrous, having on the order of less than about 5 weight percent, preferably less than about 2.5 weight percent water (or less than about 0.45 mole, preferably less than about 0.21 mole, water per each mole calcium and magnesium). This is in contrast to teachings that CMA compositions desirably have 3 to 4 moles water per mole magnesium, and thus, at least about 6 to 8 moles water. See, e.g., U.S. Pat. No. 4,699,725 to Gancy.

Preferred are CMA slurries having a slightly alkaline pH. More preferred are slurries having a pH of about 7 to 8.5. Especially preferred are slurries having a pH of about 7.5 to about 8. Such slurries yield deicing compositions having advantageous alkaline pH's which decrease damage to pavement surfaces. Also such slurries decrease the production of oversize particles in the distributing and drying steps and also advantageously decrease acetic acid emissions which must be controlled for environmental reasons.

In one embodiment of the process of the present invention the drying and pelletizing step comprises distributing the CMA slurry in a thin layer on discrete substrate particles and drying the substrate particles. The substrate particles may comprise either an inert support, such as for example a traction aid, fertilizer (such as urea, ammonium phosphate, phosphate rock or the like) or other aggregate; or preformed AEC particles. The distributing and drying steps may be repeated to give a plurality of thin layers of AEC until the deicing agent particles reach the desired particle size. To be fluid and pumpable, said slurry generally contains about at least 50% by weight water. Preferred are slurries containing from about 55% to about 68% water. Preferably, the slurry of step (b) is heated to a temperature of about 100° F. to about 250° F.; more preferably, to a temperature of about 170° F. to about 200° F. Slurries having lower moistures may need to be heated to higher temperatures in order to be fluid and pumpable. The distributing and drying steps may be performed at substantially the same time.

Various materials may be used as the substrate upon which the CMA slurry is distributed. Preferred substrates include traction aids and preformed CMA particles.

Accordingly, the above processes provide particulate CMA double salt deicing compositions of sufficiently high density that they penetrate ice rapidly and have a uniformity in size, substantially isodimensional shape, and pellet hardness such that a maximum of deicing effectiveness is obtained with a minimum of dust problems during handling and application.

The deicing compositions prepared according to the above processes are substantially isodimensional and may have particle sizes in a wide or narrow size range with an average size that is large or small as desired.

For example, deicing compositions may be prepared having a size range as small as 48 Tyler mesh (about 0.295 mm diameter) to about 0.371(5) inches (about 9.5 mm diameter). In one embodiment the size is in the $-5$ to $+28$ mesh size range. Such particle sizes are preferred due, in part, to their ease of use with conventional machinery for the distribution of deicing compositions.

Product size may be controlled by selecting an appropriate mesh size product screen. For example, a 7-mesh product (fines) screen may be used to meet a specification of 90% +8 mesh; a 7½ mesh screen may be used to meet a specification of 90% minimum +9 mesh.

DEFINITIONS

As used herein, the following terms have the following meanings, unless expressly stated to the contrary.

The term "slurry" indicates a solution of a soluble substance possibly above the saturation point for the soluble substance, whether or not the solution contains non-soluble suspended material. (See, e.g., U.S. Pat. No. 3,333,297.) For example, an AEC slurry may comprise an AEC solution or a solution comprising both dissolved, undissolved AEC, and unreacted raw materials.

The term "alkaline earth" refers to elements in Group IIa of the Periodic Table, and includes, for example, beryllium, calcium, magnesium, strontium, barium, radium, and the like.

The term "alkali metal" refers to metallic elements in Group Ia of the Periodic Table and includes, for example, lithium, sodium, potassium, rubidium, cesium, francium, and the like.

The term "AE base" refers to alkaline earth or alkali metal bases or mixtures thereof which are capable of reacting with a carboxylic acid to form a carboxylate salt. Typical AE bases include oxides, hydroxides, carbonates and the like of the alkaline earth and alkali metal elements. Such AE bases may contain one or more of the individual alkaline earth or alkali metal elements in various combinations and molar ratios.

The term "calcium and magnesium base" or "CM base" refers to AE bases wherein said alkaline earth or alkali metal portion comprises calcium, magnesium or mixtures thereof.

The term "magnesium base" refers to AE bases where said alkaline earth or alkali metal portion comprises magnesium.

The term "AEC" refers to alkaline earth or alkali metal carboxylates or mixtures thereof where the carboxylate group has from 1 to 4 carbon atoms. The term AEC includes single salts such as calcium acetate, magnesium acetate, and potassium acetate as well as mixed salts such as calcium magnesium acetate as well as physical mixtures or products of cocrystallization of single and/or mixed salts.

The term "CA" or "calcium acetate" refers to both anhydrous calcium acetate and its hydrates.

The term "MA" or "magnesium acetate" refers to both anhydrous magnesium acetate and its hydrates.

The term "calcium magnesium acetate" or "CMA" refers to calcium magnesium acetate compositions having the empirical formula $Ca_wMg_z(Acetate)_{2(w+z)}$, where w is moles calcium and z is moles magnesium and thus refers to calcium magnesium acetate compositions which may have essentially any molar ratio of calcium to magnesium.

The term "calcium magnesium acetate double salt" or "CMA double salt" refers to a salt of calcium magnesium acetate wherein both calcium and magnesium are cocrystallized together and do not comprise a physical mixture of calcium acetate and magnesium acetate, said salt having an empirical formula consistent with that noted above for CMA. It is believed that the CMA double salt has the following approximate empirical formula: $Ca_xMg_y(Acetate)_{2(x+y)}$, where x=3 to 4 and y=7 to 6.

The terms "calcium magnesium ratio" or "calcium to magnesium ratio" refer to the ratios of moles calcium to moles magnesium.

Unless stated otherwise, all percents refer to percent by weight.

The term "traction aid" refers to materials which help improve traction when applied to a slippery surface. Thus, the term includes inert supports which have good antislip properties and includes materials such as sand, crushed limestone, pulverized corncobs, nutshells (such as walnut shells, pecan shells, almond shells or the like), expanded shale, vermiculite, pumice, cinders, other substantially insoluble minerals with good antislip properties, or the like.

The term "mesh" refers to mesh sizes determined according to the Tyler standard sieve series.

The term "slurry pH" refers to the pH of the CMA slurry as measured by diluting one part slurry to two parts water.

BRIEF DESCRIPTION OF THE DRAWINGS

FIG. 1 is a schematic drawing showing the steps of one embodiment of the present invention.

FIG. 2 is an elevational view of semidiagrammatic character which shows a combined distributor-dryer apparatus used in one embodiment of the process of the present invention.

FIG. 3 is a longitudinal section through the drum element of FIG. 2 and its end appurtenances.

FIG. 4 is a transverse sectional view of the drum element of FIG. 2.

FIG. 5A is a chart showing the TGA-GC-MSD spectrum for crystalline calcium acetate hemihydrate.

FIG. 5B is a chart showing the TGA-GC-MSD spectrum for crystalline magnesium acetate tetrahydrate.

FIG. 5C is a chart showing the TGA-GC-MSD spectrum for a physical mixture of crystalline calcium acetate hemihydrate and crystalline magnesium acetate tetrahydrate having a 1:1 weight ratio.

FIG. 6A is a chart showing the TGA-GC-MSD spectrum for a CMA double salt sample of the present invention having sample No. B8105-02-6.

FIG. 6B is a chart showing the TGA-GC-MSD spectrum for a CMA sample prepared according to U.S. Pat. No. 4,606,836, having a 1:1 calcium:magnesium ratio and sample No. B8105-40-3.

FIG. 6C is a chart showing the TGA-GC-MSD spectrum for a CMA sample prepared according to U.S. Pat. No. 4,606,836, having a 3:7 calcium:magnesium ratio and sample No. B8105-40-5.

FIG. 7A is a chart showing the X-ray diffraction pattern for crystalline calcium acetate hemihydrate.

FIG. 7B is a chart showing the X-ray diffraction pattern for crystalline magnesium acetate tetrahydrate.

FIG. 7C is a chart showing the X-ray diffraction pattern for a CMA double salt sample of the present invention, having sample No. B8105-02-5.

FIG. 7D is a chart showing the X-ray diffraction pattern for a CMA double salt sample of the present invention having sample No. B8105-02-6.

FIG. 7E is a chart showing the X-ray diffraction pattern for CMA sample having a calcium:magnesium ratio of 1:1 and having sample No. B8105-02-4.

FIG. 7F is a chart showing the X-ray diffraction pattern for CMA sample having a calcium:magnesium ratio of 3.3:6.7, prepared at low temperature and having sample No. B5669-23-2.

FIG. 7G is a chart showing the X-ray diffraction pattern for a CMA double salt sample of the present invention without the superimposed crystalline CA peak points.

FIGS. 8A to 8D are charts showing TGA-GC-MSD spectra for a CMA double salt sample of the present invention prepared according to the process described in Example 10.

FIGS. 9A to 9D are charts showing TGA-GC-MSD spectra for a CMA double salt sample of the present invention prepared according to the process described in Example 10A.

FIGS. 10A to 10D are charts showing TGA-GC-MSD spectra for a commercial CMA sample from Verdugt.

FIGS. 11A to 11D are charts showing TGA-GC-MSD spectra for a CMA sample having a calcium:magnesium ratio of 2:8 prepared according to U.S. Pat. No. 4,699,725.

FIGS. 12A to 12D are charts showing TGA-GC-MSD spectra for a CMA sample having a calcium:magnesium ratio of 1:2 prepared according to U.S. Pat. No. 4,699,725.

DETAILED DESCRIPTION OF THE INVENTION

The CMA double salt compositions produced according to the present invention are produced according to our process which comprises preparing a fluid, pumpable CMA slurry and then drying and pelletizing the CMA slurry. Preferably the CMA slurry is dried and pelletized by distributing CMA slurry having a temperature of at least about 130° F. to about 150° F., preferably from about 170° F. to 200° F., in a thin layer onto discrete substrate particles (which may optionally comprise CMA or a traction aid) and drying the substrate particles to give a particulate (or pelletized) deicing composition.

PRODUCTION OF CMA SLURRY

Typically, the CMA slurry is prepared by mixing CM base, acetic acid and water, preferably in an agitated vessel. Preferably CM base and water are first mixed, to give a flowable aqueous CM base mixture, typically comprising at least about 40 percent by weight water; then acetic acid is added. The CM base is reacted with a sufficient stoichiometric amount of acetic acid to give a CMA slurry having a pH which provides complete reaction of CM base and minimal acid vapor loss and also results in a CMA composition with low corrosivity. Preferably, the ratio of acetic acid to CM base is carefully adjusted to give substantially complete reaction of CM base and to minimize volatilization of unreacted acid during the subsequent distributing and drying steps. Accordingly, preferably sufficient acetic acid is added to react with the CM base to give a CMA slurry with a pH of about 7 to about 8.5, more preferably from about 7.5 to 8.0 (when diluted 1 part slurry to 2 parts water) which is substantially free of acid odor. Optionally, reslurried CMA dust collected by dust collection means (during the distributing and drying step) may be added to the slurry. Such addition may increase the slurry pH above 8.5, without the undesirable increase in insolubles otherwise usually seen at pH's above about 8.5. Such slurries result in a finished CMA product having a pH of about 9 to about 10 (when diluted 1 part product to 9 parts water).

Slurries having low pH's (about 5 to 6) may result in increased production of oversized product during the distributing and drying steps and in unacceptably high acetic acid emissions from an environmental standpoint. Such slurries may result in products of unacceptable corrosivity and which cause discoloration and scaling of pavement surfaces when used for deicing.

Sufficient water is added, either alone or as part of the acetic acid solution, to give a fluid, pumpable slurry which does not solidify. Slurries having insufficient water may abruptly solidify, particularly if heated. We have found that if a slurry contains less than about 50% by weight water (on the order of about 30 moles water per mole CMA), excessive thickening of the slurry may occur at about 170° F. As lower slurry moistures are employed, the resulting slurry must be heated to a higher temperature. Accordingly, preferred are slurries having at least about 50% water. Particularly preferred are CMA slurries having from about 55% to about 68% water. Although CMA slurries having greater amounts of water may be used, such additional water later must be removed in the drying step and thus slurries having higher water contents may be less economical and disadvantageous due to increased drying costs. Also, using lower slurry moistures may require heating the resulting slurry to a higher temperature before the distributing and drying steps.

Suitable CM bases include oxides, hydroxides, carbonates and the like of calcium, magnesium or mixtures thereof in various molar ratios.

Preferred CM bases include dolomitic lime, hydrated dolomitic lime, preferably Type S hydrated dolomitic lime and magnesium oxide.

Preferred CM bases are those which are low in those impurities, such as iron and aluminum, which form insoluble acetate salts.

Suitable forms of acetic acid include both dilute acetic acid solutions (as low as about 10 percent) and concentrated acetic acid such as glacial acetic acid and acetic acid solutions having intermediate concentrations. The acetic acid used herein may be produced by chemical or by alternative methods such as fermentation of cellulosic materials my microorganisms and the like. Acetic acids produced by alternative methods such as microbial fermentation may have cost advantages over more concentrated acetic acid produced by conventional methods used in the chemical industry which might outweigh the economic disadvantages of possible increased drying costs due to their diluteness and thus the need to evaporate more water to obtain a dry product.

Preferred acetic acids include glacial acetic acid.

The CMA slurry is aged to allow complete reaction of CM base with acetic acid. Even when using reactive CM bases which have relative short reaction times with acetic acid, it is preferred to age the slurry. This may be done by allowing it to flow through a reactor train of several vessels before reaching the drying and pelletizing step. Reactor trains having residence times of about 3.5 to 4 hours provide more than sufficient time to allow complete reaction of CM base and acetic acid. Reactor trains having longer residence times, on the order of about 10 to about 13 hours, or more, may be used if desired.

PRODUCTION OF DEICING COMPOSITION FROM CMA SLURRY

Preferably, a fluid, pumpable CMA slurry is heated to a temperature of about 100° F. to about 250° F., preferably to at least about 150° F., more preferably from about 170° F. to about 200° F. We have surprisingly found that heating the CMA slurry to a relatively high temperature, preferably from about 170° F. to about 200° F. improves efficiency in the subsequent distributing step and thus yield. Moreover, we have found that in preparing CMA, maintaining a high slurry temperature results in production of a higher proportion of the CMA as CMA double salt. In addition, when slurries are not heated to a sufficiently high temperature, for example, less than about 100° F., in the distributing step much of the slurry may go to dust rather than to forming a thin layer on substrate particles. Such dust must be collected in a high efficiency dust collector such as a baghouse or wet scrubber and then is generally recycled, generally with additional water. Thus, the overall amount of water which must be removed in the drying step increases which increases manufacturing costs.

Moreover, we have discovered that another beneficial effect of operation with high slurry temperature was that the hardness of the CMA coating increased by 50% for high slurry temperature operation compared to low slurry temperature operation. This increase in the hardness of the CMA coating provided a product that can better withstand degradation to form dust and fines during shipping and storage of the product.

As noted previously, the CMA slurry must contain sufficient water so that it remains fluid and pumpable and does not solidify. Such slurries generally contain at least about 50% water. Particularly, preferred are slurries having about 55% to about 68% water. Low slurry water content may also result in formation of higher dust and fines in the distributing step. Higher than required slurry water contents may result in increased drying costs and reduced manufacturing efficiency.

In one embodiment the process of the present invention the CMA slurry is distributed onto discrete substrate particles to give a thin layer of CMA on substrate particles. Atomizing air of from about 0 to 100 psig, preferably from about 0 to about 20 psig, may be used. We have surprisingly found that not using additional atomizing air in distributing the slurry on the substrate particles results in increased production and also decreased the amount of the slurry that went to dust and fines. Preferably, said thin layer of CMA substantially surrounds said substrate particles and forms a substantially continuous layer. The layered substrate particles are then dried. The layered substrate particles may be recycled through the distributing and drying steps adding additional thin layers of CMA with each distributing and drying cycle to give a plurality of CMA layers on said substrate particles until the desired particle size for the deicing composition is obtained.

Suitable substrate particles may be inert supports such as, for example, traction aids, fertilizer (such as urea, ammonium phosphate, phosphate rock or the like), or other aggregates, or preformed CMA particles. Particularly preferred substrate particles include sand, especially sand of −10 to +20 mesh size, and preformed CMA particles. Preformed CMA particles may be obtained by crushing deicer compositions having layers of CMA on substrate such that prepared by the present process and separating CMA material from inert support (if any). Preformed CMA particles may be provided by recycling a set portion of product of desired size to obtain oversized particles which are then crushed to provide a supply of preformed CMA particles.

The distributing and drying steps optionally may be carried out simultaneously, such as by distributing a thin layer of CMA slurry on substrate particles in the presence of a heated gas or said distributing and drying steps may be performed separately in sequence.

In one preferred embodiment the distributing and drying steps are performed substantially simultaneously. In this embodiment, the slurry is distributed onto a dense falling curtain of substrate particles in the presence of a heated gas (such as air). The heated gas contacts the substrate particles at substantially the same time as the slurry is distributed in a thin layer on the substrate particles. Droplets of slurry are distributed on the substrate particles, and the water flashed off leaving a thin coating of dry CMA on substrate particles. The flowrate and temperature of the heated gas are controlled such that the water from the thin layer of CMA slurry on the substrate particles is flashed off. Optionally, undersized substrate particles are recycled through the combined distributing and drying step to give additional layers of CMA as necessary to give the desired particle size for the substantially isodimensional product. Where preformed CMA particles comprise the substrate, product size or oversize particles may be crushed to obtain a continuous supply of preformed CMA particles or undersized particles may be used without crushing.

The layered substrate particles may be screened to remove fines which may be recycled to receive additional layers of CMA; oversized material may be fed to a suitable crusher.

Since the present process may be used to prepare deicing agents having various ratios of individual alkaline earths and alkali metals, the type and amount of alkaline earth or alkali metal base is controlled to give the desired content of individual alkaline earths and alkali metals. Accordingly, the alkaline earth bases used herein are controlled to give deicing compositions comprising CMA double salt having a calcium to magnesium ratio of about 4:6 to about 3:7, preferably about 3:6 to about 3:7.

FIG. 1 illustrates one embodiment of the process of the present invention.

In FIG. 1, water is fed through line 10, which has a suitable means for the control of rate of flow into mix tank 12. Simultaneously, CM base ("AE Base No. 1") through line 14 and, if more than one CM base is used, CM base No. 2 ("AE Base No. 2") through line 16 are fed into tank 12. If additional CM bases are used, they may be fed into tank 12 through additional feed lines. The mixture overflows through line 18 into optionally agitated reactor 22. Acetic acid ("carboxylic acid") is fed through line 20 into reactor 22 whereby it reacts with the CM base to give a CMA slurry. The CMA slurry overflows through line 24 into surge tank 26. Dust recovered from dust collector 66 is fed into surge tank 26 with additional water, if indicated. Heating means 28 heats the slurry in surge tank 26. Suitable heating means 28 include a steam jacket, steam coil or other heating means. Heated CMA slurry is pumped from surge tank 26 through line 30 through atomizing nozzles 32 so positioned in contactor 34 so that the sprayed slurry impinges on a dense curtain of substrate particles cascading from lifters 36 in contactor 34. Substrate particles enter contactor 34 through line 38 or CMA layered substrate through recycle line 40. The layered substrate particles are dried in dryer 42. A stream of gas is drawn through line 44 into heating means 46 (where it is heated by natural gas or other suitable heating means) and then the heated gas is drawn through line 48 into dryer 42. In one preferred embodiment contactor and dryer means are combined so that substrate particles are dried immediately after coating (see FIGS. 2 to 4). In another embodiment contactor and dryer means are separate. Layered substrate exits dryer 42 through line 50 and goes into separator means 52. Separator means 52 removes fines which are removed and returned through line 54-40 to contractor 34 for additional coating. Oversize material goes through line 56 into crusher 58 (suitable crushers include hammermill or roll crushers) and then is returned through line 60-40 to contactor 34. Product is withdrawn through line 62 and then sent to shipping or storage. (Where substrate particles comprise CMA particles, optionally a set portion of product may be recycled to contactor 34 to obtain oversized material which is then crushed to generate CMA substrate particles.) Alternately, product may be cooled in a rotary drum cooler or fluid bed cooler or other suitable cooling means.

Substrate particles are continuously fed through line 38 (or recycle 40) into contactor 34. Adjustments are made in the quantity of material in contactor 34 and the internal configuration of contactor 34 to minimize the return of discharge particles and to provide the most uniform level coating on each particle.

Air and dust are removed from dryer 42 through line 64. Dust is recovered in dust collector means 66. Suitable dust collector means 66 include, for example, a baghouse, wet scrubber or other conventional dust removing systems. Air is discharged to the atmosphere (outside) through line 68. Recovered dust collected in dust collector means 66 is returned through line 70 to surge tank 26. (Alternatively, where dust collector means comprise a wet scrubber, a CMA dust and water mixture may be returned to mix tank 12 through a conduit.)

In the process for preparing the deicing compositions of our invention, either preformed or undersized CMA particles or inert support, including traction aids, may be used as substrate particles.

FIGS. 2 to 4 show a combined distributor-dryer apparatus suitable for use with a preferred embodiment of the present invention. That apparatus is more fully described in U.S. Pat. No. 3,333,297 to Tytus et al which is incorporated herein by reference.

In brief, the combined distributor-drying apparatus shown in FIGS. 2 to 4 includes hollow elongated drum 102 which is mounted for rotation. Substrate enters drum 102 through conduit 104. Vanes 106 help feed substrate delivered by conduit 104 toward vanes 108 which line drum 102. Vanes 108 are shown in cross section in FIG. 4. CMA slurry is delivered through conduit 110 to spray nozzle 112. Atomizing air pressures of about 0 to about 100 psig, preferably from about 0 to about 20 psig, may be used. It is especially preferred that no additional atomizing air is used with the atomizing nozzle. We have found that not using additional atomizing air decreased the amount of slurry that went to dust and fines. This is surprising, since it was thought that atomizing air of about 20 to 80 psig air pressure on spray nozzles was required to keep coated substrate product from sticking to the lifters and to aid slurry in adhering to substrate particles. A hot gas is supplied to the drum by conduit 113. As drum 102 rotates, vanes 108 act to shower substrate particles in curtains vertically and longitudinally of the drum said curtains moving across the drum. Slurry is sprayed through nozzle 112 on the plurality of traveling curtains of substrate particles distributing a thin layer on the particles which is dried by the hot drying gases passing through the drum. The spraying and drying action is repeated as the substrate particles traverse drum 102 to reach dam 114 at the exit end of drum 102. Manifold 116 receives both hot gases and substrate particles. Substrate particles enter receiving means 118 from where they are sized, and if indicated, recycled into drum 102.

In another embodiment of the process of the present invention, separate distributing and drying means are employed. Suitable apparatus for separate distributing means include drum granulators, pan granulators, pug mills and other conventional granulating and pelletizing machinery. Suitable separate drying means include rotary drum and fluid bed dryers as well as other conventional means for drying pelleted or granulated materials. Such apparatus are used with sufficient substrate particles to give a rolling bed of substrate particles upon which the slurry may be distributed. Such apparatus is adjusted to give a sufficient recycle ratio to provide build-up of layers on substrate particles to give the desired size product.

CONTINUOUS PREPARATION OF CMA DOUBLE SALT

In a preferred embodiment of the present invention, substantially pure CMA double salt which is substantially free from unreacted magnesium base and is substantially anhydrous is produced by a continuous process.

Water and calcium and magnesium bases (such as calcium oxide, magnesium oxide and dolomitic lime) are continuously mixed to give an aqueous CM base mixture. Sufficient water is added to give a flowable mixture, at least about 40 percent by weight water.

The CM base mixture and from about 70 percent to about 110 percent of the stoichiometric amount of acetic acid are simultaneously added together to give a steady state of about 1.8 mole (90 percent of the stoichiometric amount) acetic acid per each mole of calcium and magnesium. If too little acid is added, or the acid is added at too slow a rate, side products may form and precipitate out (for example, calcium acetate as a white precipitate and magnesium acetate as an amorphous precipitate).

Additional acetic acid is added, as needed, to maintain a slurry pH of about 7 to 8.5, preferably from about 7.5 to 8. Slurry pH is monitored; after diluting the slurry, one part slurry to two parts water, the pH of the thusly diluted slurry is measured.

The slurry is then aged for period of time sufficient to allow ionization of the acetic acid and substantially complete reaction. This aging may be accomplished by the slurry flowing through a series of vessels so that the combined residence times are sufficient for substantially complete reaction. We have found that residence times on the order of about 3.5 to 4 hours are sufficient; longer residence times (on the order of about 10 to about 15 hours) may be used. The heat of reaction of CM base with acetic acid may give slurry temperatures above 150° F. and in the preferred range of about 170° F. and 200° C.; however, during the aging step it may be desirable to heat the slurry to maintain its temperature in the preferred range and maintain its fluidity.

After aging, the slurry is heated (if necessary) to a temperature of about at least 150° F., preferably to about 170° F. to about 200° F. The slurry is then distributed on substrate particles and dried as described above.

CALCIUM MAGNESIUM ACETATE DOUBLE SALT

The compositions of the present invention which comprise substantially pure crystalline CMA double salt having a calcium to magnesium ratio of about 1:2 exhibit certain properties which are different from not only CA, MA, and physical mixtures of CA and MA, but also from other CMA compositions which are made by other processes and are not substantially pure crystalline CMA double salt.

The substantially pure crystalline CMA double salt of the present invention is substantially free of crystalline CA and crystalline MA, as evidenced by X-ray diffraction. The X-ray diffraction technique is described in Example 16. The substantial absence of CA is evidenced by the substantial absence of the most intense peaks of crystalline CA at about 5.2° and 7.4° two-theta. The substantial absence of crystalline MA is evidenced by the substantial absence of the most intense peak of crystalline MA at about 12.5° to 13° two-theta. Instead, the characteristic very strong double peak in the range of two-theta 8.75° to 10.5° are observed for the crystalline double salt; these peak positions are centered at about 9.1° and 9.8° two-theta.

The amount of crystalline CA and MA impurities can be estimated from the X-ray diffraction patterns. To do so, the peak intensities for the CMA peaks located at about 9.1° and 9.8° are added together and compared to the peak intensities for the CA peaks located at about 5.2° and 7.4° plus two times the peak intensity for MA centered at about 12.7° two-theta. Substantially pure crystalline CMA double salt has the percentage of these impurity peaks relative to the sum of the two CMA peaks equal to less than about 8%, preferably less than about 5%.

The substantially pure crystalline CMA double salt of the present invention is also substantially free of amorphous (and crystalline) MA and free of unreacted magnesium base, as determined by TGA-GC-MSD. This technique takes the evolved bases from thermogravimetric analysis (TGA) and subjects them to gas chromatography using a mass selective detector (TGA-GC-MSD) set at 15 to 200 atomic mass units.

When monitoring the TGA-GC-MSD at the mass for $CO_2$ and/or acetone as discussed in Examples 14 and 15, the substantial absence of MA is evidenced by the substantial absence of peaks at 29 to 35 minutes, i.e., about 290° to 350° C. At the same time, unreacted magnesium base, either $Mg(OH)_2$ or magnesium oxide hydrate, gives a peak at about 300° C., when present. Amounts greater than about 1 weight percent of unreacted magnesium base, relative to CMA, can be detected by this technique. Unreacted base is observed in some of the products produced by the direct reaction process disclosed by others, but not in the products produced using the slurry process of the present invention.

The amount of MA and magnesium base impurities can be calculated from the TGA-GC-MSD. To calculate the amount of MA impurity, monitor the evolved acetone spectrum. The area under the peaks from about 29 to 35 minutes (about 290° to 350° C.), which correspond to the MA impurity, is compared to the area under all the acetone peaks from 20 to 45 minutes (200° to 450° C.). The MA acetone evolution as a percent of the total acetone evolution can thus be determined. The substantially pure crystalline CMA double salt has no more than 5 percent of this MA impurity, as calculated in this manner. To calculate the amount of magnesium base impurity, monitor the evolved water spectrum. The area under the peak coming off at about 300° C. corresponds to the water from magnesium hydroxide or magnesium oxide impurities. Substantially pure crystalline CMA double salt has this percentage of magnesium base impurity at less than about 3 weight percent of the CMA, preferably at less than about 1 percent.

As described above, the substantially pure CMA double salt of the instant invention is substantially free of all of the following: crystalline CA; crystalline and amorphous MA; and unreacted magnesium base.

More specifically, this substantially pure CMA double salt meets the following criteria:

1. It is substantially free of crystalline CA and crystalline MA, as evidenced by its X-ray diffraction pattern, i.e., the sum of the impurity peaks for CA and MA relative to the sum of the two intense CMA peaks (as discussed above) is less than about 8%, preferably less than about 5%.

2. It is substantially free of amorphous (and crystalline) MA and free of unreacted magnesium base, as determined by TGA-GC-MSD, i.e., the MA acetone evolution is less than 5 percent of the total acetone evolution; and the magnesium base impurity (as measured by water evolution at about 300° C.) is less than about 3 weight percent, preferably less than 1 weight percent of the CMA sample.

The substantially pure CMA double salt compositions show a distinctive pattern when subjected to TGA-GC-MSD analysis (see FIG. 6A) as compared with crystalline CA, crystalline MA, and a physical mixture of crystalline CA and MA (see FIGS. 5A, 5B and 5C respectively) or as compared with CMA compositions prepared by other processes (see FIGS. 6B and 6C).

The TGA-GC-MSD analyses depicted in FIGS. 5A to 5C and FIGS. 6A to 6C plot the relative ion abundance of acetone and carbon dioxide (the main decomposition products of acetate) over time at a constant heating rate of 10°/minute. The carbon dioxide abundance was scaled down by a factor of 3 in order to match the scale of acetone abundance to show the fine structure of the GC-MSD chromatogram. Further description of this procedure is found in Examples 14 and 15.

FIG. 5A depicts the TGA-GC-MSD analysis for crystalline CA hemihydrate. Basically, CA decomposes upon heating to give acetone and calcium carbonate; calcium carbonate further decomposes to give carbon dioxide. Note that only small amounts of carbon dioxide are detected during the time frame plotted. Most of the carbon dioxide is evolved at a higher temperature (about 600° to 800° C.) than that reflected in FIG. 5A.

FIG. 5B depicts the TGA-GC-MSD analysis for crystalline MA. MA behaves much like CA, except that magnesium carbonate decomposes at lower temperatures and the evolved $CO_2$ is thus detected during the time frame plotted.

FIG. 5C depicts the TGA-GC-MSD analysis for a physical mixture of CA and MA. The mixture was prepared by grinding CA and MA together with a 1:1 weight ratio.

FIG. 6A depicts the TGA-GC-MSD analysis for a CMA double salt according to the present invention. A comparison with the analyses shown in FIGS. 5A, 5B and 5C show that this sample contained a minimum amount of residual CA and MA. With a proposed decomposition mechanism or reaction scheme as follows:

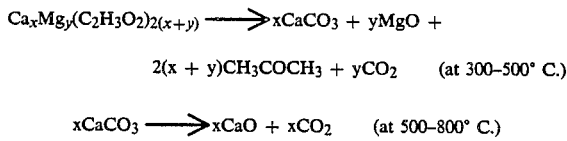

$Ca_xMg_y(C_2H_3O_2)_{2(x+y)} \longrightarrow xCaCO_3 + yMgO +$ $2(x + y)CH_3COCH_3 + yCO_2$ (at 300–500° C.)

$xCaCO_3 \longrightarrow xCaO + xCO_2$ (at 500–800° C.)

Assuming the above scheme, the x/y ratio from the TGA data is calculated to be 0.55 which is in good agreement of the elemental analysis result of that sample of 0.52. Accordingly, the TGA-GC-MSD analysis would indicate that the sample was substantially pure calcium magnesium acetate double salt with a calcium to magnesium mole ratio of about 1 to about 2.

FIG. 6B depicts the TGA-GC-MSD analysis of a CMA sample having a calcium to magnesium acetate ratio of about 1:1 which was prepared according to the process disclosed in U.S. Pat. No. 4,606,836 (a "direct reaction" process). From a comparison with FIG. 5A and FIG. 6A, it may be seen that that sample contained a substantial amount of residual CA, a evidenced by the peaks monitored at the molecular weight of acetone at about 40 and 42 minutes.

FIG. 6C depicts the TGA-GC-MSD analysis of a CMA sample having a calcium to magnesium ratio of 3:7 which was prepared according to the same direct reaction process as the sample of FIG. 6B. This sample is also not of the present invention. From a comparison with FIGS. 5A, 5B and 6A, it may be seen that the sample contained substantial amounts of both residual CA and MA.

When subjected to analysis by powder X-ray diffraction, the crystalline CMA double salt of the present invention has a characteristic pattern as compare with crystalline CA and crystalline MA and CMA compositions which are not substantially pure CMA double salt. (See FIGS. 7A to 7G.)

The X-ray diffraction patterns depicted in FIGS. 7A to 7F show that crystalline CA, crystalline MA and CMA double salt all exhibit characteristic X-ray diffraction patterns. Further description of the methodology is set forth in Example 16. Table XIII summarizes the peak positions for CMA double salt of the present invention.

FIG. 7A depicts the X-ray diffraction pattern for crystalline CA hemihydrate, with two strongest peaks at two-theta about 5.2° and about 7.4°.

FIG. 7B depicts the X-ray diffraction pattern for crystalline MA tetrahydrate. It shows the strongest peak at two-theta 12.5° to 13°. Amorphous MA shows a strong broad diffraction peak centered at about 10° two-theta.

FIG. 7C depicts the X-ray diffraction for a CMA double salt according to the present invention. Overlapped on this chart are sharp vertical lines for the peak positions corresponding to crystalline CA. The double salt exhibits a characteristic very strong double peak in the range of two-theta 8.75° to 10.5°. These peaks are centered at about 9.1° and 9.8°. The strongest crystalline MA peak is absent, indicating that the sample appears to contain substantially no residual crystalline MA. The very low intensity peaks coinciding with the two-theta range of the two strongest CA peaks (at 5.2° and 7.4°) indicate that this sample contained only very small amounts of residual crystalline CA and thus appears to comprise substantially pure CMA double salt.

FIG. 7D also depicts the X-ray diffraction of a CMA double salt according to the present invention with crystalline CA peak points superimposed. The sample exhibits the strong double peak in the range of two-theta 8.75° to 10.5° characteristic of the CMA double salt. The absence of the strongest crystalline MA peak coupled with the presence of only very low intensity peaks coinciding with the two-theta range for the strongest crystalline CA peaks would indicate that this sample contained substantially pure CMA double salt with substantially no residual crystalline MA, and only very small amounts of crystalline CA.

FIG. 7E depicts the X-ray diffraction pattern of a CMA sample not of the present invention having a calcium to magnesium molar ratio of 1 to 1 which was prepared by the slurry process of Example 7. The diffraction pattern of this sample exhibits the double peak characteristic of CMA double salt, but also exhibits peaks of moderate intensity corresponding to the two-theta values of the two strongest peaks of crystalline CA and a peak at low intensity corresponding to the two-theta range of the strongest peak of crystalline MA. Therefore, from a review of its X-ray diffraction pattern, it would appear that while this sample contains CMA double salt, it also contains moderate amounts of crystalline CA and some crystalline MA, and thus is not substantially pure CMA double salt.

FIG. 7F depicts the X-ray diffraction pattern of a CMA sample not of the present invention having a calcium to magnesium ratio of 3 to 7, but which was prepared at low temperature according to Example 11. The diffraction pattern of this sample exhibits the double peak characteristic of CMA double salt, but also shows peaks of moderate intensity which correspond to the two-theta range of the two strongest peaks of crystalline CA. Accordingly, it would appear that this sample contained moderate amounts of crystalline CA, and is not substantially pure CMA double salt.

FIG. 7G depicts the X-ray diffraction pattern of a CMA sample of the present invention without the superimposed lines corresponding to the peak positions of crystalline CA. This pattern clearly shows the absence of crystalline CA and MA in this sample. As noted above, Table XIII summarizes these peak positions and intensities.

In addition, we have found that heating the CMA slurry to relatively high temperatures during the process of preparing the deicing compositions results in deicing compositions having a higher proportion of crystalline CMA double salt as compared with CA and/or MA. See FIGS. 7C, 7D, 7F, and 7G.

FIG. 8 shows the TGA-GC-MSD spectra for the CMA sample prepared according to Example 10. FIG. 9 shows the TGA-GC-MSD spectra for the CMA sample prepared according to Example 10A. FIG. 10 shows the TGA-GC-MSD spectra for a commercial CMA sample prepared by Verdugt. The calcium to magnesium ratio was about 3:7. FIG. 11 shows a CMA sample prepared by the method of Gancy, U.S. Pat. No. 4,699,725, Example III containing a calcium to magnesium ratio of about 2 to 8. FIG. 11 shows a CMA sample prepared by the method of Gancy, U.S. Pat. No. 4,699,725, Example IIB containing a calcium to magnesium ratio of about 1 to 2.

The A portion of each of these figures shows the total ion count. The B portion of the figures shows the evolved $CO_2$ as a function of time, and therefore temperature. The C portion of the figures shows the evolved water as a function of time, and therefore temperature. The D portions of the figure shows the evolved acetone as a function of time, and therefore temperature.

As can be seen by comparing FIGS. 8 through 11, the samples prepared by the method of the present invention as shown in FIGS. 8D and 9D are substantially free of peaks in the evolved acetone spectrum below 35 minutes (about 350°), and therefore are substantially free of magnesium acetate. The commercial sample and samples prepared by methods disclosed by others, as shown in FIGS. 10D, 11D, and 12D respectively all show significant MA peaks.

Table 16 summarizes the X-ray diffraction and TGA-GC-MSD data for several samples of CMA. The data shown include the X-ray peak intensities for the CMA double salt at 9.1° and 9.8° two-theta, and the peak intensities for the crystalline CA impurity (peaks located at 5.2° and 7.4° two-theta) in these samples. Also shown on this Table is the amount of water in the samples, as determined by TGA, and the amount of MA, as determined by the ratio of the evolved acetone peaks in the TGA-GC-MSD. The MA acetone evolution is calculated as a percent of total acetone evolution. None of these samples had unreacted magnesium base, so this data is not shown.

Samples A00636, B00796, B00801, and K-10-11-87 are samples of substantially pure crystalline CMA double salt. The other samples show significant amounts of crystalline CA in the X-ray diffraction data, or MA in evolved acetone data from the TGA-GC-MSD; these samples are clearly not substantially pure crystalline double salt.

EXAMPLES

The following non-limiting examples are typical of deicing compositions prepared according to the process of the present invention. The preparations of Examples 1 to 7 and 10 were performed using apparatus having combined distributing and drying means substantially as shown in FIGS. 2 to 4.

Unless stated otherwise, measurement of slurry pH was performed after diluting the slurry one part slurry to two parts water and then measuring the pH of the thusly diluted slurry.

EXAMPLE 1

Batchwise Preparation of Calcium Magnesium Acetate on Sand

A calcium magnesium acetate (CMA) slurry was prepared batchwise by the following procedure. Seventy-two (72) gallons of water was charged to an agitated, ventilated reaction tank. One hundred fifty (150) pounds of Type S hydrated dolomitic lime was added gradually. A uniform suspension of lime in water resulted. Glacial acetic acid, Technical Grade, was pumped into the tank at a rate of about 1.0 lb/minute. The heat of reaction of the acid and lime resulted in an increase in the temperature of the mixture as the acid was added. When 186.5 lbs of acid had been added, the slurry became excessively thick. The slurry temperature was 130°. An additional 8 gallons of water was added to thin the slurry. Acid addition was resumed until a total of 239 lbs of acid had been added. The slurry pH was 8.2 initially and rose to 8.8 after standing overnight. The slurry moisture was 68%. This moisture was a little less than calculated by a mass balance and indicated that a small amount of evaporation had occurred. Subsequent batches of slurry were made in a similar way except that a larger quantity of water was added at the start to avoid thickening during the reaction stage.

The CMA slurry was then converted into a particulate deicing composition comprising CMA coated onto sand by the following methods. A pilot plant rotary drum, 3 feet diameter by 12 feet long was used. The drum was equipped with internal lifters, an internal dam and an external solids recycle system. Also included was an air system consisting of a fan, an inlet air heater and a baghouse dust collector on the outlet air.

Five Hundred (500) pounds of No. 2 Sandblasting Grade sand was charged into the rotary drum. The system was preheated to about 150° F. The CMA slurry at a temperature of about 112° F. was pumped to an atomizing nozzle positioned to spray onto the falling curtain of sand particles inside the rotating drum. The inlet air was heated to 575° F. The slurry spray rate was adjusted to 0.3 gpm as indicated by a magnetic flowmeter. A Spraying Systems Company nozzle, body number 60150 and cap number 120, was used to atomize the slurry with an atomizing air pressure of 50 psig. Solids which discharged from the outlet of the rotary drum were recycled back to the inlet of the drum. The atomized slurry coated the sand particles and was simultaneously dried. As this process continued, a uniform off-white coating of CMA was formed on the sand particles. There was no sign of particle agglomeration. Inspection of the baghouse showed that a large amount of very fine lightweight dust was collecting in the baghouse hopper. Spraying was continued and the amount of CMA coating on the sand increased steadily with time. As spraying was continued, samples were withdrawn over time that consisted of particles with 16%, 27%, 36% and 56% CMA coating. Calculations showed that the spray yield (weight percent of the CMA sprayed that goes to a coating on the sand rather than to dust) was only 42%. (This meant that there would be a very high dust recycle required in a commercial process and the production rate would be substantially lowered and the drying costs would be substantially increased because of the low spray yield.)

The composite particles consisted of individual sand particles coated substantially evenly with an outer shell of CMA. The crushing strength of the CMA shell was measured and found to decrease as the percent CMA increased. With the highest percent CMA, and the softest shell, the shell was sufficiently hard to withstand normal storage and handling without appreciable breakage. The crushing strength of the outer shell of the 56% CMA pellets was 2.8 lbs force as measured with a force gauge.

The pH of a solution of the product was 10.2 for 1 part 27% CMA product mixed with 3 parts water. Tests of the final product containing 56% CMA showed a bulk density of 60.8 lbs/cu.ft.

The ice melting tendency of the 36% CMA product was tested at 27° F. The pellets stuck to the ice immediately. Visible liquid formed in 5 minutes and visible melting continued for 90 minutes. A liquid run-off of 29 milliliters was measured for 100 grams of 36% CMA pellets after 90 minutes melting time.

EXAMPLE 2

Production of CMA on Sand Deicing Composition with Increased Yield

The basic procedure outlined in Example 1 was followed. Since it was apparent that a large part of the CMA in the slurry spray was going to dust rather than to a coating on the particles, tests were run to measure the spray coating efficiency (percentage of CMA in the spray which coated substrate particles) at different slurry temperatures. This was done by analyzing the slurry for percent water combined with reading the slurry tank level to determine the amount of CMA input, and measuring of the initial weight of sand placed in the rotary drum, then analyzing the CMA coated sand for the percent CMA present as a coating on the sand particles. We discovered that the spray yield was primarily dependent on the slurry temperature. Other variables such as slurry moisture, excess unreacted lime, particle temperature and spray atomization had much smaller effects on the coating efficiency. The results for runs with CMA slurry prepared by the reaction of dolomitic lime and acetic acid are shown in Table I. The data show that spray coating yields were much higher when the slurry was heated above 155° F.

For a practical process the CMA dust that was formed must be collected and recycled to the slurry tank along with additional water. Tests were run in which all of the slurry was made from reslurried dust. The coating yields for that case were also very dependent on slurry temperature as shown in Table II.

The data in Table II showed that the spray coating yield was again much higher for heated slurry, however, it was not as high for the reslurried dust as for slurry made by reacting lime and acid. The ability to control dust formation by small changes in slurry temperature was surprising. The slurry appearance was not changed greatly by heating and such a dramatic effect on coating yield would not be expected from solubility data or from previous experience with slurry granulation.

We have discovered that another beneficial effect of operation with high slurry temperature was that the hardness of the CMA coating increased by 50% for high slurry temperature operation compared to low slurry temperature operation. This increase in the hardness of the CMA coating provided a product that can better withstand degradation to form dust and fines during shipping and storage of the product.

TABLE I

Effect of Slurry Temperature on the Spray Coating Yield in the Slurry Process for Making Calcium Magnesium Acetate Coated Sand

| Slurry Conditions: | | |
| --- | --- | --- |
| Temperature, °F. | 135–150 | 155–165 |
| Moisture, % | 62–70 | 62–70 |
| Spray Coating Yield, % | 52–61 | 78–90 |

TABLE II

Effect of Slurry Temperature on Spray Yield in the Slurry Process for Coating Sand With CMA Using Reslurried Baghouse Dust

| Slurry Conditions: | | |
| --- | --- | --- |
| Temperature, °F. | 79 | 170 |
| Moisture, % | 65 | 66–67 |
| Spray Coating Yield, % | 0 | 62 |

EXAMPLE 3

Continuous Production of CMA-coated Sand

CMA coated sand was prepared by a continuous process using the same pelletizing apparatus that was described in Example 1.

Sand was fed continuously to the inlet end of the rotary drum. Slurry was sprayed onto the moving solids in the front portion of the drum. Conditions used in initial runs gave a high rate of discharge of solids from the exit end of the drum; these solids were continuously returned to the inlet end of the drum. A portion of the exit solids was removed at frequent intervals to maintain a consistent quantity of solids in the drum. With the condition of a high solids recycle rate it was readily seen that the coated sand particles had a wide range of coating thicknesses. A portion of the fresh sand feed was traveling through the drum rapidly and did not receive much CMA coating. Other portions of the sand feed had longer residence time in the drum and received higher coating levels. The product had a salt-and-pepper appearance, since it was comprised of a mixture of lesser coated sand and higher coated sand particles.

The rotary drum was equipped with an intermediate dam which comprised an annular member of a depth that was about 15% of the drum diameter. This dam ensured a hold-up of granular material in the drum so that a large quantity of it will be available in the bed in the spray impingement zone of the drum. The dam was equipped with a gate which could be opened to allow emptying of the bed at the end of a run.

After the above tests, it was found that the gate in the dam was not sealing properly which caused a low hold-up and a high solids recycle rate. The dam was sealed and new runs were made with continuous sand feed and continuous product withdrawal. It was found possible to operate with no recycle. We discovered that this resulted in product with an even level of CMA coating. Operating conditions for this run are shown in Table III.

After 3.5 hours of operation, product that was removed was sieved into different size fractions and each fraction was analyzed for percent CMA coating. The results are shown in Table IV.

The results showed that the majority of the product was in the size range −6 to +20 mesh and that the coating level was reasonably uniform in this size range.

Continuous rector operation was demonstrated in other test runs. No unusual operation problems were encountered. Operating conditions are summarized in Table V.

As the data in Table V showed, there was an increase in pH between the reactor and the slurry tank, due to additional reaction with lime.

TABLE III

Continuous Operation of the Slurry Process for Coating Sand with CMA

| Feed Rates: | |
|---|---|
| No. 2 Sand, lb/hr | 105 |
| CMA Slurry, gpm | 0.33 |
| Slurry Conditions: | |
| Moisture, % | 68 |
| Temperature, °F. | 170 |
| Drum Operating Conditions: | |
| Dam | Gate closed and sealed |
| Inlet Air Temp. °F. | 550–570 |
| Outlet Air Temp. °F. | 164–175 |
| Spray atomization air, psig | 50 |
| Product Removal Rate, lb/hr | 140 |
| Product Analysis: | |

| Hours of Operation | % CMA |
|---|---|
| 0 (starting bed) | 26 |
| 1.5 | 25 |
| 2.5 | 31.5 |
| 3.5 | 27.8 |
| 4.5 | 36.5 |

TABLE IV

Size Distribution Versus Coating with CMA

| Mesh Size Tyler Sieve No. | Weight % | % CMA |
|---|---|---|
| +6 | 1.9 | 63.0 |

TABLE IV-continued

Size Distribution Versus Coating with CMA

| Mesh Size Tyler Sieve No. | Weight % | % CMA |
|---|---|---|
| −6 + 10 | 8.8 | 47.5 |
| −10 + 12 | 21.2 | 35.3 |
| −12 + 14 | 30.2 | 26.9 |
| −14 + 20 | 34.0 | 18.7 |
| −20 + 28 | 3.0 | 24.5 |
| −28 | 0.8 | 42.2 |

TABLE V

Continuous Reactor Operating Results

| FEED RATES | |
|---|---|
| Mix Tank: | |
| Water, lb/hr | 146 |
| Lime, lb/hr | 37.5 |
| Reactor: | |
| Acetic Acid, lb/hr | 60.0 |
| OPERATING CONDITIONS | |
| Reactor: | |
| pH (undiluted) | 6.6–7.4 |
| Temperature, °F. | 155 |
| Moisture, % | 60 |
| Residence Time, minutes | 7.8 |
| Surge Tank: | |
| pH (undiluted) | 8.3 |

EXAMPLE 4

Relationship Between Slurry pH and Product pH

During the course of making CMA coated sand compositions by procedures described in the above examples, we discovered that the product pH was significantly higher than the pH of the slurry from which it was made. Test were run to see what the product pH would be for operation with slurry that was slightly acidic. The slightly acidic slurry would be expected to give complete reaction of the lime leaving a minimum of insoluble material. It was discovered that slurry with a pH of 6.3 to 6.8 resulted in product with pH of 9.8 to 10.0. The results for operation with slurry pH from 6.3 to 6.8 are shown in Table VI.

Exit gas from the rotary drum was tested at the baghouse exit for acetic acid to determine if there was volatilization of acid. The results showed from 30 to 80 ppm acetic acid by volume, depending on slurry pH. With slurry pH levels of 6.6 or above, the exit gas acetic acid concentration was 30 ppm. With slurry pH levels of 6.3, the exit gas acid concentration was 80 ppm. Thus, apparently excess acid in the slurry was volatilized; however, there was some acid loss, even when there was no excess of acid in the slurry. These acid losses were quite small, however, based on the measured exit gas flowrate and measured concentrations of acetic acid in the exit gas of 30–50 ppm. It was calculated that the loss was less than 1 percentage of the total acetic acid in the product CMA. These acid losses were not a significant economic factor.

The pH increase during the coating operation was, nonetheless, not fully explained by the acid vapor losses described above and is thus surprising. (It is possible that a small amount of basic magnesium acetate was formed due to this acid loss but this did not appear to be a full explanation for the pH increases that were observed.) This pH increase was very beneficial and desirable, however, since a minimum of insoluble, unreacted lime was obtained due to neutralization to a neutral or slightly acidic final slurry pH but at the same time a product pH was obtained that had a pH high enough to avoid concrete scaling which may occur below pH 8 according to studies by R. W. Schenk "Ice-Melting Characteristics of Calcium Magnesium Acetate, Final Report, Executive Summary", February, 1985.

TABLE VI

| Run No. | Ca:Mg Mole Ratio | Substrate | Slurry pH* | Product pH |
|---|---|---|---|---|
| 46 | 5:5 | sand | 6.3 | 9.8 |
| 48 | 4:6 | sand | 6.7 | 10.0 |
| 45 | 3:7 | sand | 6.5 | 10.0 |
| 40 | 5:5 | CMA | 6.8 | 9.8 |
| 47 | 4:6 | CMA | 6.5 | 9.9 |
| 44 | 3:7 | CMA | 6.4 | 9.8 |

*1 Part slurry and 2 parts water.

EXAMPLE 5

Preparation of Calcium Acetate Coated on Sand

The procedure outlined in Example 1 was followed using a high calcium-containing lime to produce calcium acetate that did not contain a high level of magnesium. Slurry was made according the procedure described in Example 1. Seventy (70) gallons of water were charged into the reaction tank and 150 pounds of High Calcium Hydrated Lime (Genstar Lime Co., San Mateo, California, 85% Ca(OH)$_2$ min.), were added. Two hundred (200) pounds of Glacial Acetic Acid were added gradually. Toward the end of the acid addition, the slurry became very thick. Two gallons of water was added to thin the slurry.

The procedure outlined in Example 1 was followed to convert the slurry to calcium acetate coated sand. The test run conditions and results are summarized in Table VII. No operating problems occurred. Forty-four pounds of dust were recycled to the slurry during the run. The results shown in Table VII show that the slurry process for coating sand with acetate salts gave results for calcium acetate that were similar to the results for calcium magnesium acetate. The slurry temperature was low, 82° to 94° F., and, therefore, the spray coating yield was low, 34 percent. This finding was consistent with the results for calcium magnesium acetate which gave low yields with low slurry temperatures.

TABLE VII

| Production of Sand Coated With Calcium Acetate | |
|---|---|
| Operating Conditions: | |
| Slurry Moisture, % | 66.8 |
| Slurry Temperature, °F. | 82 to 94 |
| Inlet Air Temp., °F. | 550 to 600 |
| Outlet Air Temp., °F. | 175 to 210 |
| Slurry Feedrate, gpm | 0.3 to 0.4 |
| Results: | |
| % Ca Acetate at end of run | 21.4% |

TABLE VII-continued

| Production of Sand Coated With Calcium Acetate | |
|---|---|
| Total Baghouse Dust, % of Feed | 66 |

EXAMPLE 6

Preparation of High Magnesium Content CMA-Coated Sand

Referring to Table VIII, runs numbers 46, 48 and 45, procedures similar to those described in Example 1 were used to produce CMA-coated sand, however, a mixture of dolomitic lime and magnesium oxide was used to give a higher magnesium content. The magnesium oxide used was Grade 20, Type 325, (National Magnesia Corporation, Moss Landing, California). In addition, slurry was made slightly acidic to obtain complete lime reaction. The slurry was heated prior to spraying to increase the spray yield.

As shown in Table VIII, the pH of the final product was from 9.8 to 10.0, thus the residual base level in the product was very low. The product also had a high crushing strength for the CMA coating and high product bulk densities.

EXAMPLE 7

Preparation of "Neat-CMA"

Run numbers 35, 40, 47 and 44 of Table VIII, were made using procedures similar to Example 1 except that essentially no sand was used. The initial material was used to establish a bed of solid CMA particles in the rotary drum was obtained by crushing 56% CMA coated sand, and screening the crushed material on a 24 mesh screen to separate the CMA particles from the sand. The −24 mesh CMA particles were used as the starting bed. In commercial operation oversize product or a portion of the on size product could be crushed and recycled of the drum to provide small particles that could be coated by the slurry feed. Undersize particles could also be removed from the material that discharged from the drum by screening and then recycled with the crushed material.

As the data in Table VIII show, the bulk density of the product was from 38.4 to 44 lbs per cubic foot, lower than for the sand coated products, but high enough for good handling characteristics. In runs 35 and 40, a 24 mesh product screen was used which gave a small size product. In runs 47 and 44, a 10 mesh product screen was used which gave a much larger product. Even larger size product could be produced by using a product screen with larger openings. The crushing strength of the straight CMA pellets improved with higher slurry temperature operation (run 40) and with lower calcium to magnesium ratios (runs 47 and 44). The pellet attrition tests showed very good resistance to attrition which showed that dust formation during handling of the product would not be a problem.

TABLE VIII

Data from Pilot Plant Tests of Production of Calcium Magnesium Acetate Pellets by the Slurry Process

| | Test Number | | | | | | |
|---|---|---|---|---|---|---|---|
| | 46 | 48 | 45 | 35 | 40 | 47 | 44 |
| | Tests of sand coating with CMA utilizing high Temperature Slurry and Full Lime Neutralization | | | Straight CMA lime not fully neutralized | Tests of Straight CMA Pelletization utilizing High Temperature Slurry and Full Lime Neutralization | | |
| Ca:Mg Mole Ratio | 5:5 | 4:6 | 3:7 | 5:5 | 5:5 | 4:6 | 3:7 |
| TYPICAL CONDITIONS | | | | | | | |
| *Slurry:* | | | | | | | |
| Temperature, °F. | 175 | 180 | 170 | 167 | 174 | 180 | 180 |
| Moisture, percent | 67 | 65 | 67 | 64 | 67 | 65 | 64 |
| pH, (1 part + 2 parts $H_2O$) | 6.3 | 6.7 | 6.5 | 7.6 | 6.8 | 6.5 | 6.4 |
| *Pelletizer Conditions:* | | | | | | | |
| Inlet Air Temp., °F. | 515 | 525 | 525 | 550 | 550 | 500 | 485 |
| Outlet Air Temp., °F. | 160 | 157 | 160 | 170 | 165 | 165 | 165 |
| Sand Feed, lbs charged | 400 | 300 | 400 | trace | n.a. | n.a. | n.a. |
| *Spray Atomizer Conditions:* | | | | | | | |
| Slurry Flowrate, gpm | 0.4 | 0.4 | 0.39 | 0.28 | 0.3 | 0.35 | 0.3 |
| Air Pressure, psig | 40 | 30 | 20 | 35 | 25 | 25 | 20 |
| *Spray Yield:* | | | | | | | |
| Percent on pellets | — | — | 73 | — | — | — | — |
| *Exit Air Conditions:* | | | | | | | |
| Flowrate, scfm | — | — | — | — | — | — | 478 |
| Acetic acid, ppm | 80 | 70 | 54 | — | — | — | 37 |
| *Pelletized Product Analysis:* | | | | | | | |
| Final percent CMA | 56 | 33 | 55 | 94.6 | 100 | 100 | 100 |
| pH (1 part product to 9 parts water) | 9.8 | 10.0 | 10.0 | 9.8 | 9.8 | 9.9 | 9.8 |
| Moisture, percent | 1.8 | 1.1 | 3.5 | 8.0 | 9.1 | 3.0 | 6.1 |
| *Screen analysis, percent:* | | | | | | | |
| +6 mesh | trace | 0 | trace | 0 | 0 | trace | 1.3 |
| +8 mesh | 1.0 | trace | 0.5 | 2.7 | 1.3 | 18.0 | 29.3 |
| +10 mesh | 25.0 | 24.0 | 33.0 | 18.7 | 14.7 | 71.4 | 65.4 |
| +12 mesh | 55.0 | 61.5 | 57.0 | 19.3 | 16.7 | 9.3 | 3.3 |
| +16 mesh | 18.0 | 14.0 | 9.0 | 27.9 | 30.0 | 1.3 | 0.7 |
| +24 mesh | 1.0 | 0.5 | 0.5 | 14.7 | 22.0 | trace | trace |
| −24 mesh | trace | trace | trace | 16.7 | 15.3 | trace | trace |
| Bulk Density, lb/cu.ft | 59.1 | 69.1 | 55.5 | 43.0 | 44.0 | 40.3 | 38.4 |
| Crushing strength, lbs | 2.6 | 4.1 | 2.0 | 1.0 | 1.7 | 2.6 | 2.7 |
| Attrition, ASTM D 40580-81 | | | | 3.0 | | | |

EXAMPLE 8

Preparation of Deicing Composition By Simultaneous Reaction and Coating Process Using a Cement Mixer Calcium magnesium acetate-coated sand was prepared by the direct reaction process using a cement mixer according to the following procedure.

Into the cement mixer, twenty-five (25) pounds of sand (No. 2 sandblasting grade) were placed. The internal lifters of the mixer created a dense curtain of sand. Water, one pound, was sprayed on the sand using an atomizing nozzle. Powdered lime, 1.79 pounds of Type S hydrated dolomitic lime was added to the wet sand. Using an atomizing nozzle, 2.47 pounds glacial acetic acid were sprayed on the sand-lime mixture. After the acid addition was complete, mixing was continued for about one-half hour.

Compositions prepared in accordance with the above procedure are disclosed as sample numbers 1 and 2 of Table X.

EXAMPLE 9

Preparation of Calcium Magnesium Acetate-Coated Sand Using a Rotary Drum Pelletizer-Dryer Calcium magnesium acetate-coated sand was prepared by the direct reaction process using a rotary drum pelletizer-dryer according to the following procedure:

A rotary drum pelletizer-dryer was charged with 500 pounds of sand (No. 2 Sandblasting grade), so that sand was recirculated from the drum outlet to the drum inlet. Water was continuously sprayed on the sand in the front section of the drum, before the sand reached the lifters. Lime (Type S hydrated dolomitic), was continuously fed into the front section continuously (up to 48 pounds). After the wetted sand and dry lime mixture passed to the lifter section, acetic acid (up to 67 pounds) was sprayed on the mixture using an air atomizing spray nozzle. A flowable mass of discrete particles was obtained which had some acid odor.

A composition prepared in accordance with the above procedure is disclosed as Sample No. 3 in Table X.

EXAMPLE 10

Continuous Production of "Neat CMA"

A calcium-magnesium acetate (CMA) deicer was produced on a commercial scale by the following continuous process. Water was continuously added to a covered, agitated mix tank (at a rate sufficient to maintain about a 32 wt. % CMA slurry on exiting the reaction chain) with approximately 1440 lb/hr of Type S hydrated dolomitic lime, and approximately 750 lb/hr of magnesium oxide. The magnesium oxide was added as a slurry with water prepared by drawing solid magnesium oxide into the throat of an eductor using water as the educting medium. The resultant mixture flowed by gravity through a series of four additional mixing vessels. One overflowing through a trough into the next.

Upon overflowing the fifth mix tank, glacial acetic acid was added at a rate of approximately 9.6 gal/min. to a reactor with thorough, high shear mixing, resulting in an exit pH of approximately 5.6. The reactor was vented through a high-energy wet scrubber to reduce acetic acid emissions to the environment. The water from this scrubber was continuously blown down and used as feed water to the first mix tank. As the slurry overflowed into the second reactor, a slight flow of additional acetic acid was added to maintain a slurry pH of approximately 6.0 in the slurry tank.

The overall average recipe for CMA slurry was:
Acetic acid: 0.80 lbs/lb dried CMA
Type S lime: 0.23 lbs/lb dried CMA
Magnesium oxide: 0.11 lbs/lb dried CMA The resultant slurry was maintained at a temperature of approximately 186° F. and pumped through an atomizing nozzle and sprayed on a falling bed of CMA pellets in the front of a rolling drum. The drum was equipped with internal lifters, an internal dam and an external solids recycle system. Also included was an air system consisting of a fan, an inlet air heater and a baghouse dust collector on the outlet air. Air was introduced at a temperature of approximately 700° F., and a flow rate of approximately 29,000 standard cubic feet per minute (SCFM). The air exited the drum at approximately 151° F. and entered a baghouse for dust removal before entering the environment. The dust collected from the baghouse, approximately 1500 lb/hr, was recycled to the slurry tank and additional water added to maintain approximately a 68 wt. % moisture slurry.

CMA pellets formed or enlarged in the drum were classified with a screening system. Pellets which did not pass a ⅜-inch screen were crushed and recycled to the front of the drum. Pellets which passed through a 30-mesh screen were also recycled. Approximately 5% of the pellets which were in the product range of ⅜ inch 30 mesh were withdrawn as product and moved to the warehouse, with the remaining 95% being recycled to the front of the drum.

Product produced from this run had a calcium/magnesium mol ratio of approximately 0.45 (i.e., 3.1 to 6.9 [about 1 to 2.2]), had a pH of about 9.5, and contained about 1.86 wt. % water insoluble material.

EXAMPLE 10A

Continuous Production of "Neat CMA"

A calcium magnesium acetate (CMA) deicer was produced on a commercial scale by the following continuous process.

Water was continuously added to an agitated mixing vessel at a rate sufficient to maintain about 42 weight percent CMA slurry on exiting the reactor train with approximately 2120 pounds/hour of Type S hydrated dolomitic lime and approximately 990 pounds/hour of magnesium oxide. The resulting mixture flowed by gravity through an additional mixing vessel, overflowing one through a trough into the next.

Upon overflowing the second mixing vessel, glacial acetic acid was added at a rate of approximately 11.3 gallons/minute to a reactor with thorough mixing, resulting in an exit pH of approximately 9. As the slurry overflowed into the second reactor, a slight flow of additional acetic acid was added to maintain a slurry of approximately 7.5 in the slurry tank. The reactors were vented through a high-energy wet scrubber to reduce acetic acid emissions to the environment. The water from this scrubber was continuously used as feed water to the first mixing vessel.

The overall formula for the CMA slurry was:
Acetic acid: 0.79 pounds/pound dried CMA
Type S lime: 0.26 pounds/pound dried CMA
Magnesium oxide: 0.12 pounds/pound dried CMA The resultant slurry was maintained at a temperature of approximately 190° F. (88° C.) and pumped through an atomizing nozzle and sprayed on a falling bed of CMA pellets in the front of a rolling drum. The drum was equipped with internal lifters, an internal dam and an external solids recycle system. Also included was an air system consisting of a fan, an inlet air heater and a baghouse dust collector on the outlet air. Air was introduced at a temperature of approximately 800° F. (427° C.), and a flow rate of approximately 32,000 standard cubic feet per minute (SCFM). The air exited the drum at approximately 200° F. (93° C.) and entered a baghouse for dust removal before entering the environment. The dust collected from the baghouse, approximately 500 pounds/hour, was recycled to the slurry tank and additional water added to maintain approximately a 58 weight percent moisture slurry.

After exiting the drum, CMA pellets formed or employed in the drum were classified with a screening system. Pellets which were larger than a 6-mesh screen were crushed and recycled to the front of the drum. Pellets which were smaller than an 8-mesh screen were also recycled. Approximately 5 percent of the pellets from the drum were in the product range of minus 6 mesh to plus 8 mesh and were withdrawn as product and moved to the warehouse, with the remaining 95 percent being recycled to the front of the drum.

Product produced from this run had a calcium/magnesium mol ratio of approximately 0.46 (about 1 to 2.2), had a pH of about 9.5, and contained about 2.1 weight percent water insoluble material.

EXAMPLE 11

CMA Preparation at Low Temperature

Lime (Type S dolomitic), magnesium oxide and water were combined in a beaker to give a slurry. Glacial acetic acid was added to the slurry. The resulting slurry was heated with stirring for ½ hr to give a final slurry temperature of about 130° to 140° F. The pH of the slurry was measured; if the necessary, additional acetic acid was added to give a pH in the range of about 5.0 to 7.0. The slurry was filtered through filter paper to remove insolubles. The filtrate was dried overnight in a vacuum oven at about 95° to 100° C. to give the low temperature CMA samples.

The results for various CMA compositions, reported in percent loss on attrition are tabulated in Table X.

TABLE X

| Sample Number | Sample Id. | CMA % (CA:MA ratio) | Sub-strate | Equipment Type[1] | Reaction Type | Crush Strength, lb$_f$ | Attrition, % | % Attrition / % CMA × 100 |
|---|---|---|---|---|---|---|---|---|
| 1 | B8105-08-1 | 11 (5:5) | sand | C | direct | 2.1 | 10.2 | 92.7 |
| 2 | B8105-02-1 B8105-08-2 | 10 (5:5) | sand | C | direct | 3.2 | 4.8 | 48.0 |
| 3 | B8105-02-2 B8105-08-3 | 16 (5:5) | sand | P | direct | 5.4 | 1.7 | 10.6 |
| 4 | B8105-02-3 | 29.6 (5:5) | sand | P | slurry | 5.2 | 2.4 | 8.1 |
| 5 | B8105-08-4 | 36.8 (5:5) | sand | P | slurry | 5.1 | 2.0 | 5.4 |
| 6 | B8105-08-5 | 56 (5:5) | sand | P | slurry | 3.5 | 1.2 | 2.1 |
| 7 | B8105-02-4 B8105-08-6 | 100 (5:5) | CMA | P | slurry | 2.8 | 2.8 | 2.8 |
| 8 | — | 29.5 (3:7) | sand | P | slurry | — | 0.8 | 2.7 |
| 9 | B8105-02-5 | 100 (3:7) | CMA | P | slurry | — | 3.0 | 3.0 |
| 10 | B8105-11-1 | 28.5 (5:5) | sand | P | slurry (low temp) | — | 2.8 | 9.8 |
| 11 | B8105-11-2 | 30.5 (5:5) | sand | P | slurry (low temp) | — | 2.5 | 8.2 |
| | Sand (No. 2 Sandblasting grade) | | sand | — | — | | >15 | |

[1]C = Cement Mixer/Separate Dryer
P = Rotary Drum Pelletizer-Dryer

Samples prepared in accordance with the above procedure are disclosed in Table IX.

TABLE IX
Samples Prepared According to Example 11

| Sample No. | Reagent | Amount (g) | Ca:Mg Ratio in Sample |
|---|---|---|---|
| B5669-23-1 | Lime | 10.0 | 5:5 |
| | MgO | 0.4 | |
| | Water | 108.04 | |
| | Acetic Acid | 18.56 | |
| B5669-23-2 (X-ray diffraction pattern shown in FIG. 7F) | Lime | 5.00 | 3.3:6.7 |
| | MgO | 1.90 | |
| | Water | 100.68 | |
| | Acetic Acid | 14.36 | |

The X-diffraction pattern in FIG. 7F showed incomplete reaction to CMA double salt at this lower temperature.

EXAMPLE 12

Measurement of Crush Strength

Crush strength of the CMA layer of deicing compositions was measured using a Chatilon DPP-1 force gauge (durometer). One revolution around the gauge equaled a force of 10 lb$_f$ (divisions were in 0.1 lb$_f$ increments). The particle to be tested was placed on a lab jack immediately below the plunger/disc assembly of the force gauge. The lab jack was raised using the height adjustment screw until tee particle to be tested was held in place. The force gauge was zeroed. Pressure was applied to the particle until the CMA layers broke; the force reading at that point was taken. Results are tabulated in Table X.

EXAMPLE 13

Measurement of Attrition Resistance

The attrition resistance of CMA deicing compositions were measured using ASTM method D 4058-81.

EXAMPLE 14

Evolved Gas Analysis by TGA-GC-MSD

CMA samples produced by both the direct reaction and slurry process (Examples 1 to 9) were compared using Evolved Gas Analysis by TGA-GC-MSD. This technique took the evolved gases from a standard thermogravimetric analyzer (TGA) as they were produced over time and subjected the gases to capillary tube gas chromatography (GC). The gases at the end of the GC column were analyzed using a mass selective detector (MSD). The total ion count at several preset masses was monitored over time. Typical analyses ran about 50 minutes.

The TGA used was a DuPont 951 TGA which was set up so it was controlled by a Northstar microcomputer. The GC-MSD was a Hewlett Packard 5890A GC equipped with a 5970 quadruple MSD. The GC used either a 15- or a 50-meter SC-32 capillary column (cross-linked methyl silicone, 0.33 micron film thickness, 0.30 micron internal diameter). The TGA outlet was connected to the GC injector. The GC inlet system was set at a 100:1 split ratio. All transfer lines between the TGA and the GC injector were wrapped with heating tape.

The GC-MSD continuously monitored the TGA evolved gases.

To detect unreacted magnesium base, gas evolution at mass 18 (water) was monitored. At a temperature of about 300° C., or after about 14 to 16 minutes in the TGA, heating at a rate of 20° C./minute, the reaction of magnesium hydroxide (or hydrated magnesium oxide) to magnesium oxide was observable. The lower limit for detection of unreacted magnesium base by the above method was about 1%.

Samples of CMA prepared according to the direct reaction process method (of Examples 8 and 9) showed approximately 5% (of the CMA) as unreacted magnesium base.

Samples of CMA prepared according to the slurry process method (of Examples 1 to 7) showed essentially no detectable magnesium base.

EXAMPLE 15

Analysis of CA, MA, and CMA Samples By TGA-GC-MSD Analysis

CA and MA standards and CMA samples produced by both the direct reaction process and the slurry process as described in Examples 1 to 10A were compared using Evolved Gas Analysis by TGA-GC-MSD. This technique took the evolved gases from a standard thermogravimetric analyzer (TGA) as they were produced over time and subjected the gases to low resolution gas chromatography (GC). The gases at the end of the GC column were recorded using a mass selective detector (MSD). The total ion count at a preset mass can be monitored over time.

The TGA-GC-MSD apparatus used was described in Example 14.

The TGA-GC-MSD analyses were carried out at a heating rate of 10° C./min, unless otherwise indicated and using a helium carrier gas. The helium flow rate was set at 80 cc/min. The GC-MSD chromatograms were plotted as a function of time. The TGA starting temperature was kept at 25° C.

The relative ion abundance at the molecular weights of acetone, carbon dioxide, and water were monitored and plotted over time. In addition, a spectrum showing the Total Ion Count (TIC) versus time was also plotted. In some of the plots, the carbon dioxide abundance was scaled down by a factor of 2.5 to 3 in order to match the scale of the acetone abundance so the two plots could be overlaid on the same figure.

The CA hemihydrate and MA tetrahydrate standards were purchased from J. T. Baker. A CA-MA mixture was prepared by mixing CA and MA in a ratio of 1:1. Other CMA preparations were prepared according to processes such as these described in Examples 1 to 10A. Samples used for TGA-GC-MSD analysis were set forth in Table XI.

Gas evolution at the masses corresponding to acetone and carbon dioxide were monitored and plotted as a function of time.

The TGA-GC-MSD chromatograms are shown in FIGS. 5A to 5C and 6A to 6C plot the gas evolution at the masses corresponding to acetone and carbon dioxide as a function of time.

The TGA-GC-MSD chromatograms shown in FIGS. 8A to 8D, 9A to 9D, 10A to 10D, 11A to 11D, and 12A to 12D plot the gas evolution at the masses corresponding to water, acetone, and carbon dioxide as well as total ion content, as a function of time.

TABLE XI

| | Samples Used for TGA-GC-MSD Analysis | | |
|---|---|---|---|
| FIG. No. | Sample | Preparation | Ca:Mg Ratio |
| 5A | CA | Commercial (J. T. Baker) | Ca only |
| 5B | MA | Commercial (J. T. Baker) | Mg only |
| 5C | CA-MA physical mixture | Commercial (J. T. Baker) | 1:1 |
| 6A | B8105-02-6 | According to Example 10 | Approx. 3.5:6.5 |
| 6B | B8105-40-3 | According to | 1:1 |

TABLE XI-continued

| | Samples Used for TGA-GC-MSD Analysis | | |
|---|---|---|---|
| FIG. No. | Sample | Preparation | Ca:Mg Ratio |
| 6C | B8105-40-5 | U.S. Pat. No. 4,606,836 According to U.S. Pat. No. 4,606,836 | 3:7 |
| 8A to 8D | CMA double salt | According to Example 10 | 3.3:6.7 |
| 9A to 9D | CMA double salt | According to Example 10A | 3.1:6.9 |
| 10A to 10D | CMA | Commercial (Verdugt) | — |
| 11A to 11D | CMA | According to U.S. Pat. No. 4,699,725 | 2:8 |
| 12A to 12D | CMA | According to U.S. Pat. No. 4,699,725 | 1:2 |

EXAMPLE 16

X-Ray Diffraction Analysis

X-ray diffraction analysis was performed on crystalline calcium acetate hemihydrate, crystalline magnesium acetate tetrahydrate and various CMA samples.

The X-ray diffraction peaks of crystalline CA were superimposed on FIGS. 7A, 7C, 7D, 7E, and 7F, to help locate the position of any crystalline CA impurities.

The X-ray diffraction pattern of CMA double salt is summarized in Table XIII. The peak position in degrees two-theta; the d-spacings and the relative intensity are shown.

The analyses were done using a Siemens D500 diffractometer equipped with a copper tube (so that the two-theta values shown in FIGS. 7A to 7F are for Cu K$\alpha$ radiation). The Siemens DIFFRA 11 software package was used for peak location.

Samples used for X-ray diffraction studies are shown in Table XII.

FIGS. 7A to 7F show X-ray diffraction patterns for the samples shown in Table XII.

TABLE XII

| | Samples For X-Ray Diffraction | | |
|---|---|---|---|
| FIG. No. | Sample | Preparation | Ca:Ma Ratio |
| 7A | CA | Commercial (J. T. Baker) | Ca only |
| 7B | MA | Commercial (J. T. Baker) | Mg only |
| 7C | B8105-02-5 | According to Example 7 | 3:7 |
| 7D | B8105-02-6 | According to Example 10 | 3.5:6.5 |
| 7E | B8105-02-4 | According to Example 7 | 1:1 |
| 7F | B5669-23-3 | According to Example 11 | 3.3:6.7 |
| 7G | CMA double salt | According to Example 10 | 3:7 |

TABLE XIII

X-Ray Powder Diffraction Data for Crystalline CMA Double Salt (Cu K$\alpha$ Radiation)

| 2$\theta$ Degrees | Spacing d, Å | Relative Intensity[a] |
|---|---|---|
| 9.1 | 9.7 | vs |
| 9.8 | 9.0 | m |
| Ca-13.9 | 6.4 | vvw |

TABLE XIII-continued

X-Ray Powder Diffraction Data for Crystalline CMA Double Salt (Cu Kα Radiation)

| 2θ Degrees | Spacing d, Å | Relative Intensity[a] |
|---|---|---|
| 16.2 | 5.5 | vvw |
| 17.2 | 5.2 | vvw |
| 18.2 | 4.9 | vvw |
| 18.5 -Mg | 4.8 | vvw |
| 19.8 | 4.5 | vvw |
| 20.9 | 4.3 | vvw |
| 21.7 | 4.1 | vvw |
| 22.4 | 4.0 | vvw |
| 23.6 | 3.8 | vvw |
| 23.8 | 3.7 | vvw |
| 24.1 | 3.7 | vw |
| 25.2 | 3.6 | vvw |
| 25.7 | 3.5 | vvw |
| Ca-26.1 | 3.4 | vvw |
| Ca-26.9 | 3.3 | vvw |
| Ca-27.6 -Mg | 3.2 | vvw |
| 28.1 | 3.2 | vw |
| 28.9 | 3.1 | vvw |
| 30.6 -Mg | 2.9 | vvw |
| Ca-31.5 | 2.8 | vvw |

Ca-There is overlap with a peak from Ca(C$_2$H$_3$O$_2$)$_2$·½H$_2$O.
Mg-There is overlap with a peak from α-Mg(C$_2$H$_3$O$_2$)$_2$·4H$_2$O.
[a]vs = 100–80;
s = 80–60;
m = 60–40;
w = 40–20;
vw = 20–10;
vvw = 10–0

TABLE XIV

Analysis of CMA Samples
X-Ray Diffraction - Net Peak Intensity CPS

| Sample | Preparation | CA·½H$_2$O 5.2° 2θ | CA·½H$_2$O 7.4° 2θ | CMA 9.1° 2θ | CMA 9.8° 2θ | Ratio: $\frac{CA}{CMA}$, %[4] | TGA TGA H$_2$O | MA Acetone[5] $\frac{}{\text{Total Acetone}}$, % | CA:MA Mole Ratio |
|---|---|---|---|---|---|---|---|---|---|
| A00186[3] | Commercial (Verdugt) | 5 | 6 | 2,496 | 1,470 | 0.28 | — | — | — |
| A00283[3] | Commercial (Verdugt) | Not detected | 20 | 9,291 | 5,183 | 0.14 | 4.1 | 6.9 | — |
| A00245[2] (B8105-40-3) | According to U.S. Pat. No. 4,606,836 | 403 | 518 | 4,408 | 2,453 | 13.42 | 3.0 | 1.7 | 1:1 |
| A000216[1] (B8105-40-5) | According to U.S. Pat. No. 4,606,836 | 85 | 86 | 11,970 | 6,880 | 0.91 | 5.3 | 17.1 | 3:7 |
| A00636 (B-8258-12-27) | According to Example 10A | 105 | 105 | 4,104 | 2,350 | 3.25 | 2.0 | 3.0 | 3:7 |
| B00796 | According to Example 10A | 250 | 285 | 9,260 | 5,380 | 3.65 | 2.2 | 3.7 | 3:8 |
| B00801 | According to Example 10A | 283 | 325 | 8,090 | 4,842 | 4.70 | 0.8 | 2.9 | 3:6 |
| K-10-11-17 | According to Example 10A | 140 | 120 | 10,230 | 5,763 | 1.88 | 0.9 | 2.3 | 3:7 |

[1]Contains significant amount of MA, and a small amount of an unidentified phase.
[2]Contains significant amounts of crystalline CA.
[3]Contains MA as crystalline α-Mg(C$_2$H$_3$O$_2$)$_2$·4H$_2$O.
[4]From X-ray peak intensities.
[5]By TGA-GC-MSD, area under evolved acetone peaks.

What is claimed is:

1. A composition comprising less than about 8% by weight crystalline calcium acetate, less than about 8% by weight magnesium acetate, about 1% to about 3% by weight unreacted base, less than about 5% by weight water and the remainder being calcium magnesium acetate double salt.

2. A composition according to claim 1 containing less than about 5 percent by weight crystalline calcium acetate, less than about 5 percent by weight magnesium acetate, and about 1 percent by weight unreacted magnesium base.

3. A composition according to claim 1 which is substantially anhydrous.

4. A composition according to claim 1 containing less than about 2.5 percent by weight water. acetate, and less than about 1 percent by weight unreacted magnesium base.

5. A composition according to claim 1 which exhibits TGA-GC-MSD spectra substantially the same as FIGS. 6A, 8A to 8D or 9A to 9D and an X-ray diffraction pattern substantially the same as FIG. 7C, 7D or 7G.

6. A composition according to claim 1 having a calcium:magnesium ratio of about 4:6 to about 3:7.

7. A composition according to claim 6 having a calcium:magnesium ratio of about 3:6 to about 3:7.

8. A composition according to claim 7 which exhibits TGA-GC-MSD spectra substantially the same as FIGS. 8A to 8D or 9A to 9D and an X-ray diffraction pattern substantially the same as FIG. 7C, 7D or 7G.

9. A composition according to claim 1 having the empirical formula:

$$Ca_xMg_y(C_2H_3O_2)_{2(x+y)}$$

wherein x is 3 to 4 and y is 7 to 6.

10. A composition according to claim 9 which exhibits TGA-GC-MSD spectra substantially the same as FIGS. 6A, 8A to 8D or 9A to 9D and an X-ray diffraction pattern substantially the same as FIG. 7C, 7D or 7F.

11. A composition according to claim 9 containing less than about 2.5 weight percent water.

12. A composition according to claim 11 containing less than about 5 percent by weight crystalline calcium acetate, less than about 5 percent by weight magnesium acetate and about 1 percent by weight unreacted magnesium base.

13. A composition according to claim 12 which exhibits TGA-GC-MSD spectra substantially the same as FIGS. 6A, 8A to 8D or 9A to 9D and an X-ray diffraction pattern substantially the same as FIG. 7C, 7D or 7G.

14. A deicing composition which comprises a plurality of layers of a composition according to claim 9 on discrete substrate particles.

15. A deicing composition according to claim 14 wherein said substrate particles comprise a traction aid.

16. A deicing composition according to claim 14 wherein said substrate particles comprise particles of a calcium magnesium acetate double salt.

17. A deicing composition comprising a composition according to claim 1 which has a bulk density of at least about 40 pounds per cubic foot, a particle specific gravity greater than about 1.2 and attrition of less than about 3 percent.

18. A pelletized deicing composition comprising a composition according to claim 9 which has a bulk density of at least about 40 pounds per cubic foot, a particle specific gravity greater than about 1.2 and attrition of less than about 3 percent.

19. A process for preparing a calcium magnesium acetate double salt which is substantially free from crystalline calcium acetate, magnesium acetate and unreacted magnesium base which comprises:
(a) preparing an aqueous mixture of CM base having a calcium:magnesium ratio of from about 4:6 to about 3:7 which contains at least about 40 percent by weight water;
(b) admixing the mixture of step (a) with from about 70 percent to about 110 percent of the stoichiometric amount of acetic acid necessary to convert said CM base to said double salt, the resulting mixture containing at least about 50 percent by weight water to give a CMA slurry;
(c) if required, adding sufficient additional acetic acid to said slurry so that the total amount of acetic acid is approximately the stoichiometric amount of acetic acid necessary to convert said CM base to said double salt; and
(d) aging the CMA slurry to allow substantially complete reaction of the CM base with acetic acid.

20. A process according to claim 19 further comprising:
(e) drying and pelletizing the slurry of step (d) to give a dry, free-flowing product.

21. A process according to claim 20 wherein said drying and pelletizing of step (e) comprises distributing the slurry of step (d) in a thin layer on discrete substrate particles and drying the substrate particles.

22. A process according to claim 21 wherein in step (e) the slurry of step (d) is distributed in a thin layer on a falling curtain of discrete substrate particles in the presence of heated gas to give layered particles.

23. A process according to claim 22 further comprising:
(f) repeating step (e) to give layered particles having a plurality of layers on said particles.

24. A process according to claim 19 wherein step (b) further comprises simultaneous admixing the mixture of step (a) and said amount of acetic acid.

25. A process according to claim 24 wherein step (c) further comprises measuring the pH of the slurry of step (b) and, if necessary, adding sufficient acetic acid to give a pH of about 7 to about 8.5.

26. A process according to claim 19 wherein step (d) is conducted at a temperature of at least about 150° F.

27. A process according to claim 19 wherein step (d) is conducted at a temperature of about 170° F. to about 200° F.

28. A process according to claim 27 wherein the CMA slurry contains from about 55 percent by weight to about 68 percent by weight water.

29. A process according to claim 27 wherein step (b) further comprises admixing about 90 percent by weight of the stoichiometric amount of acetic acid.

30. A process according to claim 29 wherein step (d) comprises aging said slurry for at least about 3.5 hours.

31. A process for preparing a calcium magnesium acetate double salt which is substantially free from crystalline calcium acetate, magnesium acetate and unreacted magnesium base and which is substantially anhydrous, comprising:
(a) preparing an aqueous mixture of CM base having a calcium:magnesium ratio of about 4:6 to about 3:7 which contains at least about 40 percent by weight water;
(b) simultaneously admixing the mixture of step (a) with about 90 percent of the stoichiometric amount of acetic acid necessary to convert said CM base to said double salt; the resulting mixture containing at least about 50 percent by weight water, to give a CMA slurry;
(c) in necessary, adding additional acetic acid to give a pH of about 7 to about 8.5;
(d) aging the CMA slurry to allow substantially complete reaction of the CM base with acetic acid; and
(e) drying and pelletizing the slurry of step (d) to give a dry, free-flowing product.

32. A process according to claim 31 wherein step (d) is conducted at a temperature of at least about 150° F.

33. A process according to claim 31 wherein step (d) is conducted at a temperature of about 170° F. to about 200° F.

34. A process according to claim 32 wherein said drying and pelletizing of step (e) comprises distributing the slurry of step (d) in a thin layer on discrete substrate particles and drying the substrate particles.

35. A process according to claim 34 wherein said distributing of step (e) is done without additional atomizing air.

36. A process for preparing a calcium magnesium acetate double salt having the empirical formula:

$$Ca_xMg_y(C_2H_3O_2)_{2(x+y)}$$

wherein x is 3 to 4 and y is 7 to 6 which is substantially free of crystalline calcium acetate, magnesium acetate and unreacted magnesium base comprising:
(a) preparing an aqueous, flowable mixture of CM base having a calcium:magnesium ratio of about 4:6 to about 3:7;
(b) admixing the mixture of step (a) with from about 70 percent to about 110 percent of the stoichiometric amount of acetic acid necessary to convert said CM base to said double salt to give a CMA slurry, said slurry containing sufficient water to be fluid and pumpable;
(c) if required, adding sufficient additional acetic acid to said slurry so that the total amount of added acetic acid is approximately the stoichiometric amount of acetic acid necessary to convert said CM base to said double salt; and
(d) aging the CMA slurry to allow substantially complete reaction of the CM base with acetic acid.

37. A process according to claim 36 further comprising:
(e) drying and pelletizing the slurry of step (d) to give a dry, free-flowing product which is substantially anhydrous.

38. A process for preparing a calcium magnesium acetate double salt which is substantially free from crystalline calcium acetate magnesium acetate and unreacted magnesium base which comprises:
- (a) preparing an aqueous mixture of CM base having a calcium:magnesium ratio of from about 4:6 to about 3:7 which contains at least about 40 percent by weight water;
- (b) admixing the mixture of step (a) with from about 70 percent to about 110 percent of the stoichiometric amount of acetic acid necessary to convert said CM base to said double salt and, if necessary, adding sufficient additional acetic acid to said slurry so that the total amount of acetic acid is approximately the stoichiometric amount necessary to convert said CM base to said double salt, so that substantially complete reaction occurs.

39. A process according to claim 38 further comprising:
- (a) drying and pelletizing the slurry of step (b) to give a dry, free-flowing product which is substantially anhydrous.

* * * * *

UNITED STATES PATENT AND TRADEMARK OFFICE
CERTIFICATE OF CORRECTION

PATENT NO. : 4,913,831

DATED : April 3, 1990

INVENTOR(S) : Harold E. Todd, Jr. et al.

It is certified that error appears in the above-identified patent and that said Letters Patent is hereby corrected as shown below:

Claim 4, Col. 34, lines 2-4, "than about 2.5 percent by weight water. acetate, and less than about 1 percent by weight unreacted magnesium base." should read --than about 2.5 percent by weight water.--

Signed and Sealed this

Fifth Day of October, 1993

Attest:

BRUCE LEHMAN

Attesting Officer

Commissioner of Patents and Trademarks